(12) United States Patent
Matsumaru et al.

(10) Patent No.: US 6,894,986 B2
(45) Date of Patent: May 17, 2005

(54) TRANSMISSION MANAGING APPARATUS FOR MANAGING A TRANSMISSION STATE OF INFORMATION

(75) Inventors: Makoto Matsumaru, Tsurugashima (JP); Hidemi Usuba, Tsurugashima (JP); Sho Murakoshi, Tsurugashima (JP); Kinya Ono, Tsurugashima (JP); Seiichi Hasebe, Tokorozawa (JP); Kunihiro Minoshima, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 23 days.

(21) Appl. No.: 10/452,536

(22) Filed: Jun. 2, 2003

(65) Prior Publication Data

US 2003/0206555 A1 Nov. 6, 2003

Related U.S. Application Data

(62) Division of application No. 09/472,665, filed on Dec. 27, 1999, now Pat. No. 6,594,239.

(30) Foreign Application Priority Data

Dec. 28, 1998 (JP) .......................................... P10-374413

(51) Int. Cl.[7] .............................................. H04L 12/28
(52) U.S. Cl. ........................ 370/257; 370/433; 370/451; 370/459; 709/253; 710/124
(58) Field of Search ................................. 370/257, 431, 370/433, 447, 451, 459; 709/245, 253; 710/124

(56) References Cited

U.S. PATENT DOCUMENTS

| | | | | |
|---|---|---|---|---|
| 5,983,301 A | * | 11/1999 | Baker et al. ................. | 710/113 |
| 6,160,796 A | * | 12/2000 | Zou ............................. | 370/257 |
| 6,167,471 A | * | 12/2000 | Liu et al. ...................... | 710/62 |
| 6,266,727 B1 | * | 7/2001 | Smyers et al. .............. | 710/105 |
| 6,272,114 B1 | * | 8/2001 | Kobayashi ................... | 370/257 |
| 6,311,243 B1 | * | 10/2001 | Hamamoto et al. ......... | 710/107 |
| 6,332,159 B1 | * | 12/2001 | Hatae et al. ................. | 709/224 |
| 6,389,496 B1 | * | 5/2002 | Matsuda ...................... | 710/316 |
| 6,473,816 B1 | * | 10/2002 | Yoshida et al. ............. | 710/113 |

* cited by examiner

*Primary Examiner*—Hassan Kizou
*Assistant Examiner*—Dmitry Levitan
(74) *Attorney, Agent, or Firm*—Pitney Hardin LLP

(57) ABSTRACT

A transmission managing apparatus included in an information transmitting system comprising a communication bus (B), an indicating device (NI), which has a transmission state memory (5) for storing a channel used for an information transmission executed in a time division manner on the communication bus and a transmission occupation period occupied for the information transmission, for indicating the channel and the transmission occupation period and an information processing apparatus (N) for reserving a non-used channel and a preservable period, while referring to a memory content of the transmission state memory.

2 Claims, 20 Drawing Sheets

TRANSMISSION MANAGING APPARATUS FOR MANAGING A TRANSMISSION STATE OF INFORMATION

This application is a division of application Ser. No. 09/472,665, filed Dec. 27, 1999, now U.S. Pat. No. 6,594,239.

BACKGROUND OF THE INVENTION

1. Field of the Invention

The present invention relates to: a transmission managing apparatus which, in an information transmitting system for using serial buses to connect a plurality of information processing apparatuses to each other and transmitting information mutually between the information processing apparatuses, manages the condition in the transmission of the information; the information processing apparatus included in the information transmitting system together with the transmission managing apparatus; and the information transmitting system including the transmission managing apparatus and the information processing apparatus.

2. Description of the Related Art

Recently, a so-called IEEE 1394 standard (a regular name is "IEEE (Institute of Electrical and Electronic Engineers) Std. 1394–1995 IEEE Standard for a High Performance serial Bus") is published as a new standard to transmit information in real time through serial bus Between a plurality of information processing apparatuses (for example, between a personal computer and a digital video camera or MD (Mini Disc) and the like). Accordingly, a digital video camera, a personal computer and the like having serial ports in accordance with the IEEE 1394 standard have been manufactured.

This IEEE 1394 standard standardizes that a plurality of information processors (hereafter, merely referred to as nodes) are connected to each other through serial buses to then transmit in time division the information corresponding to a plurality of channels between the respective channels (this standard standardizes that information can be transmitted by using a maximum of 63 different channels within a system connected through one serial bus).

Here, the IEEE 1394 standard standardizes the execution of an initialization of a serial bus referred to as a so-called "bus reset", when another node is newly connected to node groups already connected to each other through the serial buses (namely, at a time of bus connection), or when one node is disconnected from the node groups (namely, at a time of bus open). Then, the following processes are executed in conjunction with the bus reset to accordingly establish a new connection condition (hereafter, the connection condition is referred to as a "topology").

(1) In conjunction with an occurrence of a bus reset, a bus reset signal indicative of the occurrence of the bus reset is transmitted to all nodes in which a node detecting the occurrence of the bus reset (namely, a node to which another node is newly connected, or a node from which an existing connection is disconnected) is connected to a serial bus.

(2) Next, a tree identification to connect the respective nodes onto a tree is carried out after the bus reset. Then, a node located at a vertex of the connected tree is recognized as a route node.

(3) Next, the recognized route node makes each node recognize an identification number (ID number) peculiar to each node to identify each node within a tree system.

(4) Next, an IRM (Isochronous Resource Manager) node is set which is a node for managing the communication states (actually, channels used by the respective nodes and later-described transmission occupation periods) in all the nodes in the generated tree, and then displaying the current usage channels and the transmission occupation periods currently occupied by the respective nodes, in such a condition that can be identified by the other nodes.

(5) Finally, a bus manger is set which is a node for controlling the information transmission states of all the nodes.

A new topology after the bus reset is established through the above-mentioned process composed of five steps.

Then, in case that the information is actually transmitted after the establishment of the topology, a transmission node which is a node trying to start transmitting the information inquires of the IRM nodes the current communication states of the other nodes. If it is possible to use a channel and a transmission occupation period that the transmission node desires to use, the transmission node obtains a right of transmitting the information (actually, the transmission node insures the channel and the later-described transmission occupation period which the transmission node desires to use), and then starts the transmission of the information. At this time, immediately before the transmission of the information, the transmission node transmits to the IRM nodes a report of re-writing a display of a communication state in the IRM node (namely, since the start of the transmission of the information in the transmission node causes the transmission occupation period and the channel currently being used on the serial bus to be changed, it is necessary to re-write the displayed content into a new communication state after this change). The IRM nodes receiving this report respectively execute a process of updating the displayed content. After that, the content displayed after the update can be referred by the other nodes.

The transmission occupation period will be schematically described below.

In the IEEE 1394 standard, the information from each node is transmitted as collection for each information unit referred to as an "isochronous cycle" (here, this "cycle" implies one cycle generated after division in time sharing on a serial bus). This isochronous cycle includes an isochronous transmission portion containing the information transmitted synchronously with the information included in another isochronous cycle (e.g., video information or audio information) and an asynchronous transmission portion containing the information transmitted asynchronously with and independently of other information (e.g., control information to control an output of the video information or the audio information). Then, the information within this isochronous transmission portion is divided in time sharing for each different channel, and different information is transmitted for each channel.

At this time, in the isochronous transmission area, it is standardized that a temporal length of the isochronous transmission area within one isochronous cycle is 100 $\mu$a sec at its maximum. Thus, it is necessary that a total period occupied by the information assigned to each channel within one isochronous transmission area for its transmission is also 100 $\mu$sec or less. At this time, a transmission period within the isochronous cycle occupied by the one channel is the above-mentioned "transmission occupation period".

In addition, this transmission occupation period may be referred to as a "usage band" of a serial bus depending on a case, or it may be referred to as a "usage capacity" of a serial bus. On the other hand, if a length of the isochronous transmission area is less than 100 $\mu$sec within the one isochronous cycle (including a case of zero), a period within an isochronous cycle other than the isochronous transmission area is used only as the asynchronous transmission area.

However, according to the IEEE 1394 standard having the above-mentioned configuration, when each transmission node starts transmitting the information, each transmission node needs to start the transmission after inquiring of the IRM node a communication state on the serial bus, checking whether or not a channel and a transmission occupation period which each transmission node desires to use can be actually used, and then insuring them if they can be used (in addition, those inquiring, checking and insuring operations are typically referred to as an "arbitration operation" on the standard).

This necessity implies the following necessity, in other words. That is, if the channel and the transmission occupation period which the transmission node desires to use cannot be used, the transmission node transiently holds the start of the information transmission. After that, it again inquires of the IRM node the channel and the transmission occupation period, and starts the information transmission only after checking and confirming that the desired channel and transmission occupation period can be used.

At this time, if the channel and the transmission occupation period cannot be insured when the inquiry as to the IRM node is once carried out, the similarly referring and insuring operations are again repeated after a wait of a preset predetermined period. However, in this case, if the communication state on the serial bus is not updated in the predetermined period (the communication state on the serial bus (i.e., the channel currently being used and the transmission occupation period currently being occupied) is not always changed in the predetermined period), this results in a problem that the transmission node needs to repeat a useless and meaningless operation of insuring the channel and the transmission occupation period which can not be insured.

In view of the whole serial buses, this problem leads to a problem that it is necessary to transmit a control signal necessary for the useless insuring operation and the like by dividing a part of the asynchronous transmission area having an upper limit, and there may be a case in which other necessary control signals and the like can not be transmitted at this time.

On the other hand, from the viewpoints of the situations of the respective nodes, the above-mentioned problems lead to a problem that the repetition of the useless insuring operation increases the burdens on the signal processes in the respective nodes.

SUMMARY OF THE INVENTION

The present invention is proposed in view of the above mentioned problems. It is therefore an object of the present invention to provide: a transmission managing apparatus which can prevent the occurrence of the useless operation of insuring the channel and the transmission occupation period when each node starts transmitting information, and accordingly improve a usage efficiency of the serial bus as a whole information transmitting system, and further prevent an increase of a process burden in each node; a node included in the information transmitting system together with the transmission managing apparatus; and the information transmitting system including the transmission managing apparatus and the node.

The above object of the present invention can be achieved by a first transmission managing apparatus included in a first information transmitting system comprising (i) a communication bus such as a serial bus, (ii) an indicating device such as an IRM node, which has a transmission state memory such as a resource register for storing a channel used for an information transmission executed in a time division manner on the communication bus and a transmission occupation period occupied for the information transmission, for indicating the channel and the transmission occupation period and (iii) a first information processing apparatus such as a node for insuring a non-used channel, which is the channel that is not used, and a preservable period, which is the transmission occupation period, that can be occupied, while referring to a memory content of the transmission state memory, to thereby carry out the information transmission. The first transmission managing apparatus is provided with: (a) a monitoring device such as a comparator for monitoring whether or not the memory content is updated; and (b) a reporting device such as a command generator for reporting a fact of updating of the memory content through the communication bus to the first information processing apparatus when the memory content is updated.

According to the first transmission managing apparatus of the present invention, when the memory content of the transmission state memory is updated, this fact of updating is reported to the information processing apparatus through the communication bus. Thus, it is possible to prevent a useless referring operation from being repeated by the information processing apparatus while the memory content is not updated.

Therefore, it is possible to prevent the communication bus from being used for the useless referring operation, so that the usage efficiency can be improved as a whole of the information transmitting system. Further, it is possible to prevent the process load from being increased by the useless referring operation in the information processing apparatus.

In one aspect of the first transmission managing apparatus of the present invention, the first transmission managing apparatus is further provided with a referring device memory such as a resource register for storing an identification number to identify one first information processing apparatus, which cannot insure the non-used channel and the preservable period, among first information processing apparatuses each referring to the memory content at a time of the information transmission, the reporting device reporting the fact of updating of memory content to the one first information processing apparatus.

According to this aspect, the fact of updating of the memory content is reported only to the information processing apparatus which could not transmit the information since the non-used channel and the preservable period could not be insured. Thus, it is possible to manage the transmission of the information efficiently within the information transmitting system.

In another aspect of the first transmission managing apparatus of the present invention, the first transmission managing apparatus is further provided with a detecting device such as a comparator for detecting the non-used channel that is newly generated and the preservable period that can be newly occupied, in conjunction with updating of the memory content, wherein, when the memory content is updated, the reporting device reports the detected non-used channel and the detected preservable period to one first information processing apparatus which cannot insure the non-used channel and the preservable period.

According to this aspect, the non-used channel and the preservable period are reported at least to the information processing apparatus, which could not insure the non-used channel and the preservable period, when the memory content is updated. Thus, it is possible for the information processing apparatus, which could not transmit the information, to speedily insure the non-used channel and the preservable period to thereby start transmitting the information.

The above object of the present invention can be also achieved by a first information processing apparatus included in the above described first information transmitting system of the present invention together with the above described first transmission managing apparatus of the present invention. The first information processing apparatus is provided with: (a) an insuring device such as a transmission controller for insuring a non-used channel, which is the channel that is not used, and a preservable period, which is the transmission occupation period, that can be occupied, while referring to the memory content, when the information is to be transmitted, and for insuring again the non-used channel and the preservable period on the basis of reporting of the reporting device when the insuring device cannot insure the non-used channel and the preservable period; and (b) a transmitting device such as a packet transmitter for carrying out the information transmission by using the insured non-used channel and the insured preservable period.

According to the first information processing apparatus, in case that the non-used channel and the preservable period cannot be insured, it is possible to prevent the useless referring operation from being performed while the memory content of the transmission state memory is not updated.

Therefore, it is possible to prevent the process load from being increased by the useless referring operation in the information processing apparatus.

The above object of the present invention can be also achieved by a first information transmitting system provided with the above described first transmission managing apparatus of the present invention and a plurality of first information processing apparatuses each having the same construction as the above described first information processing apparatus of the present invention, wherein the information transmission is carried out between the first information processing apparatuses.

According to the first information transmitting system, it is possible to prevent the useless referring operation from being performed while the memory content of the transmission state memory is not updated, so that it is possible to perform the transmission of the information efficiently.

The above object of the present invention can be also achieved by a second transmission managing apparatus included in a second information transmitting system comprising (i) a communication bus such as a serial bus, (ii) an indicating device such as an IRM node, which has a transmission state memory such as a resource register for storing a channel used for an information transmission executed in a time division manner on the communication bus and a transmission occupation period occupied for the information transmission, for indicating the channel and the transmission occupation period and (iii) a second information processing apparatus such as a node for insuring a non-used channel, which is the channel that is not used, and a preservable period, which is the transmission occupation period, that can be occupied, to thereby carry out the information transmission. The second transmission managing apparatus is provided with: (a) a monitoring device such as a comparator for monitoring whether or not a memory content of the transmission state memory is updated; (b) a transmitting apparatus memory such as a request register for storing information indicating a transmitting apparatus which is the second information processing apparatus to transmit the information, a use-channel which is to be used by the transmitting apparatus and an occupy-period which is the transmission occupation period to be occupied by the transmitting apparatus; (c) an insuring device such as a register writer for insuring the use-channel and the occupy-period on the basis of a monitoring result of the monitoring device; and (d) a reporting device such as a command generator for reporting a fact of insuring the use-channel and the occupy-period through the communication bus to the second information processing apparatus when the use-channel and the occupy-period can be insured by the insuring device.

According to the second transmission managing apparatus of the present invention, the transmission managing apparatus insures and reports the use-channel and the occupy-period in place of the transmission processing apparatus. Thus, when the memory content of the transmission state memory is not changed so that the use-channel and the occupy-period cannot be insured, it is possible to prevent a useless operation of trying to insure the use-channel and the occupy-period from being performed by the information processing apparatus. Thus, it is possible for the transmission processing apparatus to insure the use-channel and the occupy-period efficiently.

Therefore, it is possible to prevent the communication bus from being used for the useless referring operation, so that the usage efficiency can be improved as a whole of the information transmitting system. Further, it is possible to prevent the process load from being increased by the useless insuring operation in the information processing apparatus.

The above object of the present invention can be also achieved by a second information processing apparatus included in the above described second information transmitting system of the present invention together with the above described second transmission managing apparatus of the present invention. The second information processing apparatus is provided with: (a) a memory controlling device such as a resource insure request unit for controlling the transmitting apparatus memory to store the use-channel and the occupy-period; and (b) a transmitting device such as a packet transmitter for transmitting the information by using the use-channel and occupying the occupy-period when a fact that the use-channel and the occupy-period can be insured is reported by the reporting device.

According to the second information processing apparatus, when the use-channel and the occupy-period cannot be insured, the operation of trying to insure the use-channel and the occupy-period is not performed. Thus, it is possible to insure the use-channel and the occupy-period efficiently.

Therefore, it is possible to prevent the process load from being increased by the useless insuring operation in the information processing apparatus.

In one aspect of the second information processing apparatus of the present invention, the second information processing apparatus is further provided with: (c) a referring device such as a transmission controller for referring to the memory content when the information is to be transmitted; and (d) a channel and period insuring device such as a transmission controller for insuring the use-channel and the occupy-period on the basis of the referred memory content, the memory controlling device controlling the transmitting apparatus memory to store the use-channel and the occupy-period only when the use-channel and the occupy-period cannot be insured by the channel and period insuring device.

According to this aspect, only in case that the non-used channel and the preservable period cannot be insured, the transmission managing apparatus performs the insuring operation in place of the information processing apparatus. Thus, it is possible, while restraining the process load of the transmission managing apparatus to the minimum, to perform the insuring operation efficiently.

The above object of the present invention can be also achieved by a second information transmitting system provided with the above described second transmission managing apparatus and a plurality of second information processing apparatuses each having the same construction as the above described second information processing apparatus of the present invention, wherein the information transmission is carried out between the second information processing apparatuses.

According to the second information transmitting system, since each of the information processing apparatuses insures the use-channel and the occupy-period efficiently to thereby transmit the information, it is possible to transmit the information efficiently as a whole of the information transmitting system.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings.

(I) Schema of IEEE 1394 Standard

At first, prior to describing the actual embodiments, a transmission of information through a serial bus in accordance with the above-mentioned IEEE 1394 standard (hereafter, merely referred to as a "serial bus standard") according to the present invention is generically described with reference to FIGS. 1 to 3.

Figure 1A:
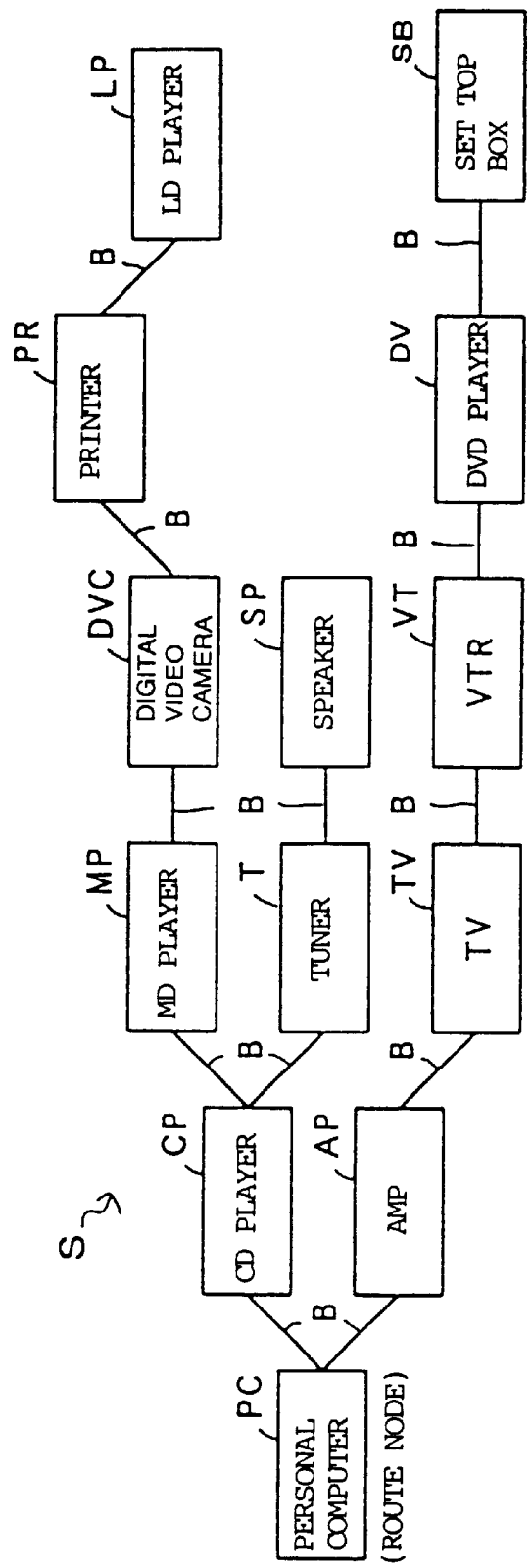
FIG. 1A is a diagram showing an example of serially-connected electrical devices, in electrical products (nodes) connected in accordance with the IEEE 1394 standard.
Figure 1B:
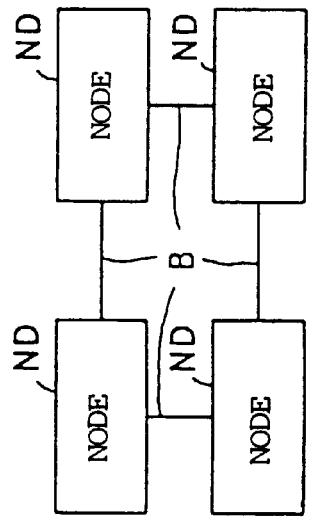
FIG. 1B is a diagram of loop connection in accordance with the IEEE 1394 standard.
Figure 2A:
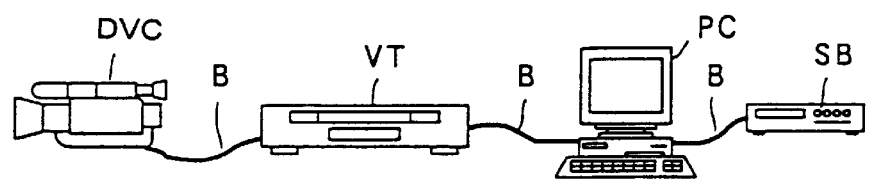
FIG. 2A is a diagram exemplifying a transmission manner on a serial bus.
Figure 2B:
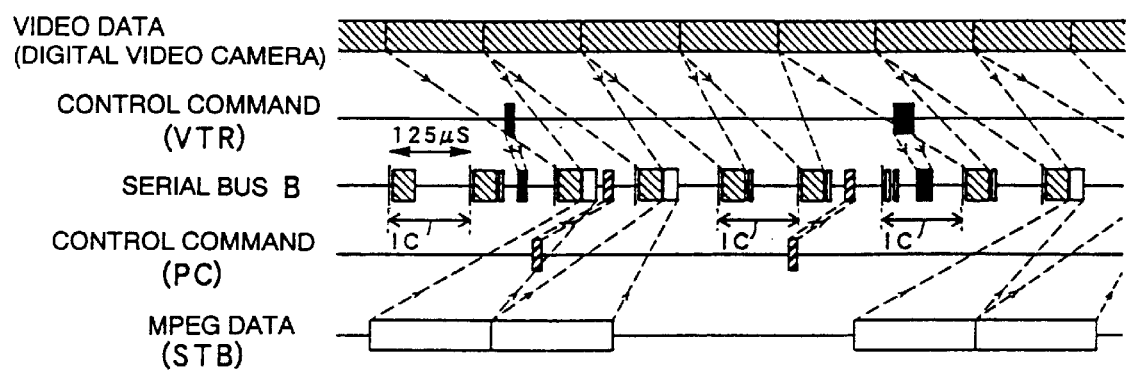
FIG. 2B is a diagram showing data and commands transmitted on the serial bus of FIG. 2A.

FIGS. 1A and 1B are diagrams exemplifying one manner of topology in the serial bus standard. FIGS. 2A and 2B are diagrams exemplifying a transmission manner on a serial bus. FIG. 3 is a diagram showing a configuration of an isochronous cycle.

The serial bus standard is a standard for a serial bus to serially connect all information processors including current or future various electrical products to each other and mutually sending and receiving information between them.

Actually, settings when the respective nodes are connected can be all automatically carried out. Moreover, a new node can be connected without turning off a power supply.

On the other hand, with regard to the manner of transmitting information, a high speed transmission can be carried out in a range between 100 Mbps (bit per second) and 3.2 Gbps. Moreover, various information can be transmitted by using real time transmission, two-way transmission and multiple-channel transmission.

As for the manner of connecting the respective nodes, as shown in an information transmitting system S of FIG. LA, for example, by setting a personal computer PC to be a route node (i.e., the node at the vertex on the topology in a form of tree, as mentioned above), various electrical products such as a CD (Compact Disc) player CP, an MD (Mini Disc) player MP, a digital video camera DVC, a printer PR, an LD (LASER Disc) player LP, a tuner T, a speaker SP, an amplifier AP, a television apparatus TV, a digital video tape recorder VT, a DVD player DV, a set top box SB for receiving a broadcast wave and the like can be respectively connected through a serial bus B so that the various electrical products can be supervised and controlled by the personal computer PC.

Here, in the serial bus standard, the number of information processors (corresponding to the above-mentioned nodes) that can be included in one system (a system connected in a form of tree through the serial bus) is 63 at its maximum. Moreover, a maximum of 16 connections can be included between two nodes in the one system. In addition, it is inhibited on the serial bus standard to connect a plurality of nodes in a form of loop, as shown in FIG. 1B, within the one system.

Next, an actually transmitting manner will be concretely exemplified and described below.

At first, as shown in FIG. 2A, it is assumed that the digital video camera DVC, the digital video tape recorder VT, the personal computer PC and the set top box SB are connected through the serial bus B to each other as respective nodes to accordingly carry out the information transmission. More concretely, it is supposed that video data from the digital video camera DVC, a predetermined control command from the digital video tape recorder VT, a control command to similarly control other units from the personal computer PC and image data (for example, MPEG data compressed in accordance with an MPEG (Moving Picture Expert Group) standard) included in the received broadcast wave from the set top box SB are sent out onto the serial bus B, respectively.

In this case, as the manner of transmitting the various information sent out on the serial bus B, the information from the respective nodes is transmitted while the information respectively occupies the serial bus B in time sharing, as shown in FIG. 2B. Then, the various information is inserted into the isochronous cycle IC serving as a synchronous unit on the serial bus B having a length of 125 μsec and is then transmitted.

Next, a data structure in the isochronous cycle IC will be described below with reference to FIG. 3.

Figure 3:
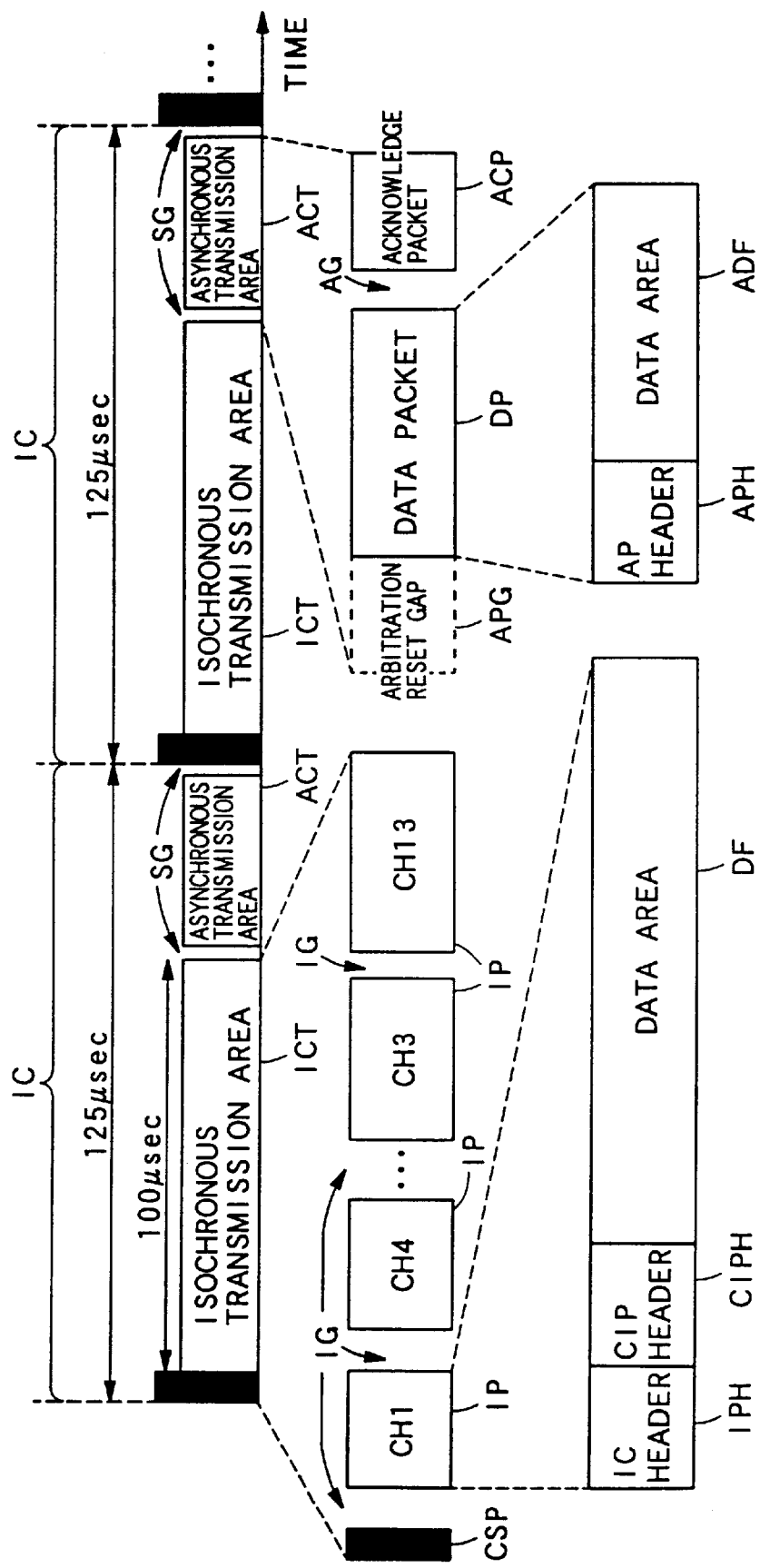
FIG. 3 is a diagram showing a configuration of an isochronous cycle.

At first, as shown in FIG. 3, the isochronous cycle IC is provided with: a cycle start packet CSP always inserted into a lead of the isochronous cycle IC in order to match standard times of all the nodes with each other; an isochronous transmission area ICT composed of isochronous packets IP corresponding to a plurality of channels and also constituted by a fact that temporally synchronous information are included in the respective isochronous packets IP; and an asynchronous transmission area ACT containing asynchronous information (for example, various control information, response information corresponding to the respective control information and the like).

Also, a sub-action gap SG, which is a temporal gap indicative of an end of one isochronous transmission area ICT or an end of one asynchronous transmission area ACT, is inserted into a final tail of each isochronous transmission area ICT and a final tail of each asynchronous transmission area ACT. Moreover, an isochronous gap IG which is a temporal gap indicative of an end of each packet is inserted between the respective isochronous packets IP and between the cycle start packet CSP and the lead isochronous packet IP. At this time, a length of the sub-action gap SG is set to be longer than that of the isochronous gap IG.

One isochronous packet IP is composed of: an IP (Isochronous Packet) header IPH containing information indicative of a data amount within each isochronous packet IP, information indicative of a channel through which the information within each isochronous packet IP is transmitted and the like; a later-described CIP header CIPH; and a data area DF containing actual video information or audio information. For example, in a case of the audio information, a plurality of data blocks are included in the data area DF such that with data corresponding to one sample is as one data block.

On the other hand, the asynchronous transmission area ACT is composed of: an arbitration reset gap APG which is a temporal gap for each node to indicate that information from each node is sent out; a data packet DP containing data, such as control information to be asynchronously transmitted and the like; and an acknowledge packet ACP containing data to be used for a reply from a node of a transmission destination. Here, an asynchronous gap AG which is a temporal gap indicative of an end of one data packet DP is inserted between the data packet DP and the acknowledge packet ACP.

Next, one data packet DP is provided with: an AP (Asynchronous Packet) header APH including information indicative of a destination of each data packet DP; and a data area ADF including information indicative of a transmission occupation period of a data packet DP occupying an asynchronous transmission area ACT, information indicative of an occupation channel or actual control information and the like.

(II) First Embodiment

Next, a first embodiment of the present invention executed in accordance with the above described serial bus standard will be described below with reference to FIGS. 4 to 9.

Figure 4:
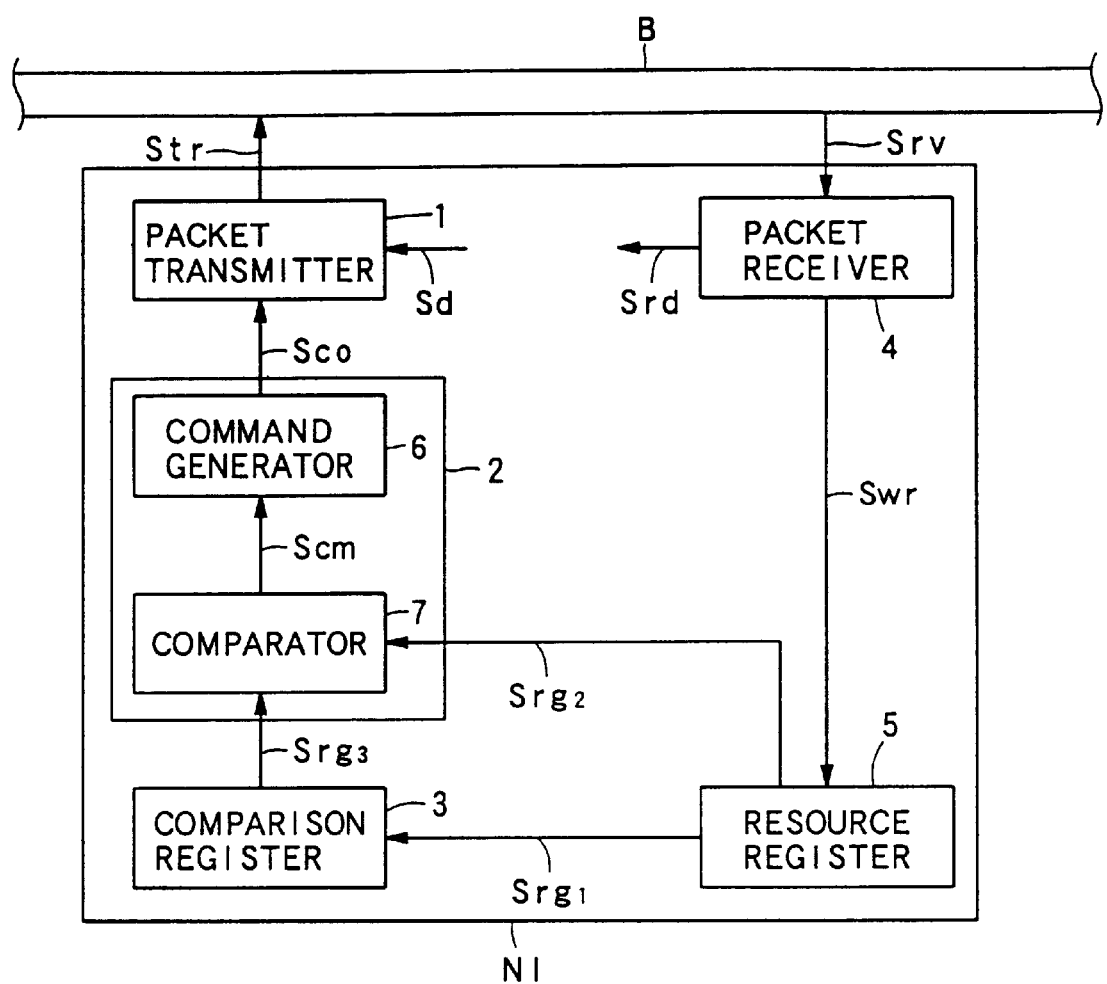
FIG. 4 is a block diagram showing a configuration of an IRM node of a first embodiment.
Figure 5:
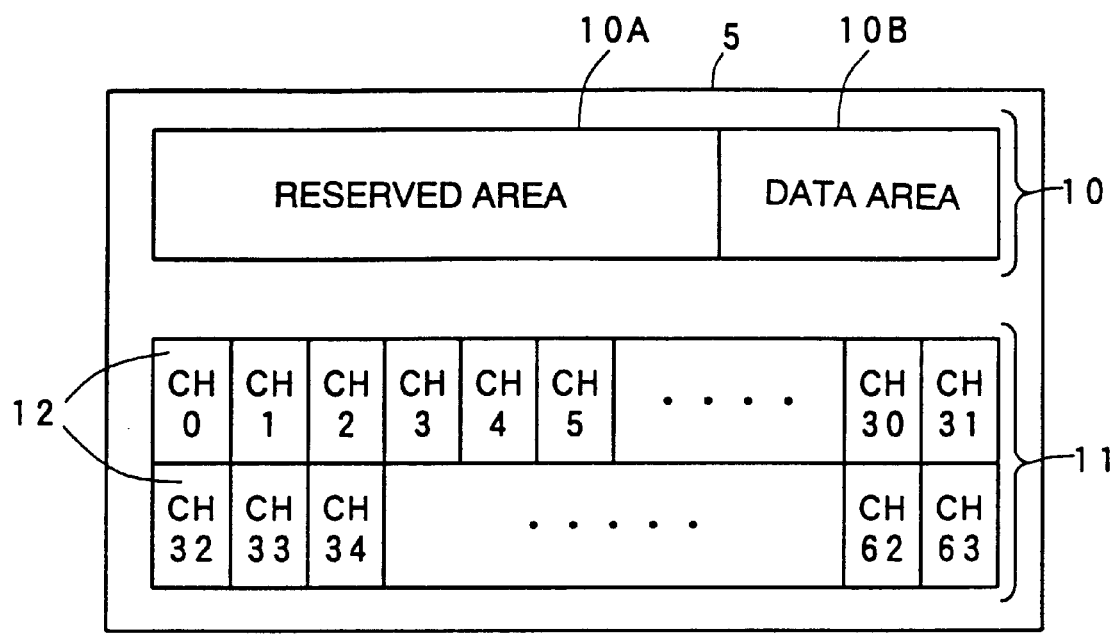
FIG. 5 is a diagram showing an inner configuration of a resource register.
Figure 6:
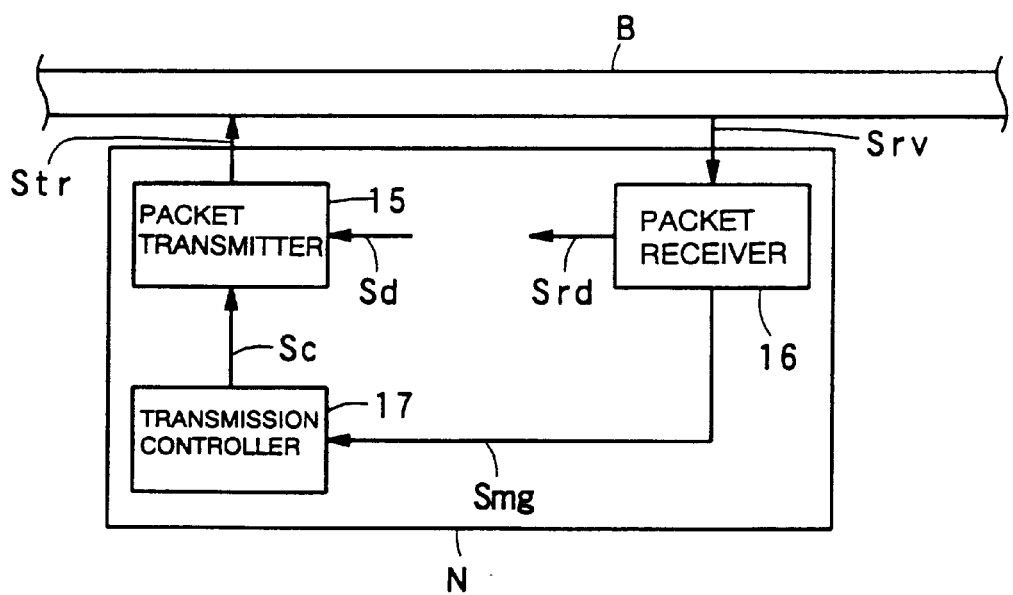
FIG. 6 is a block diagram showing a configuration of a typical node of the first embodiment.
Figure 7:
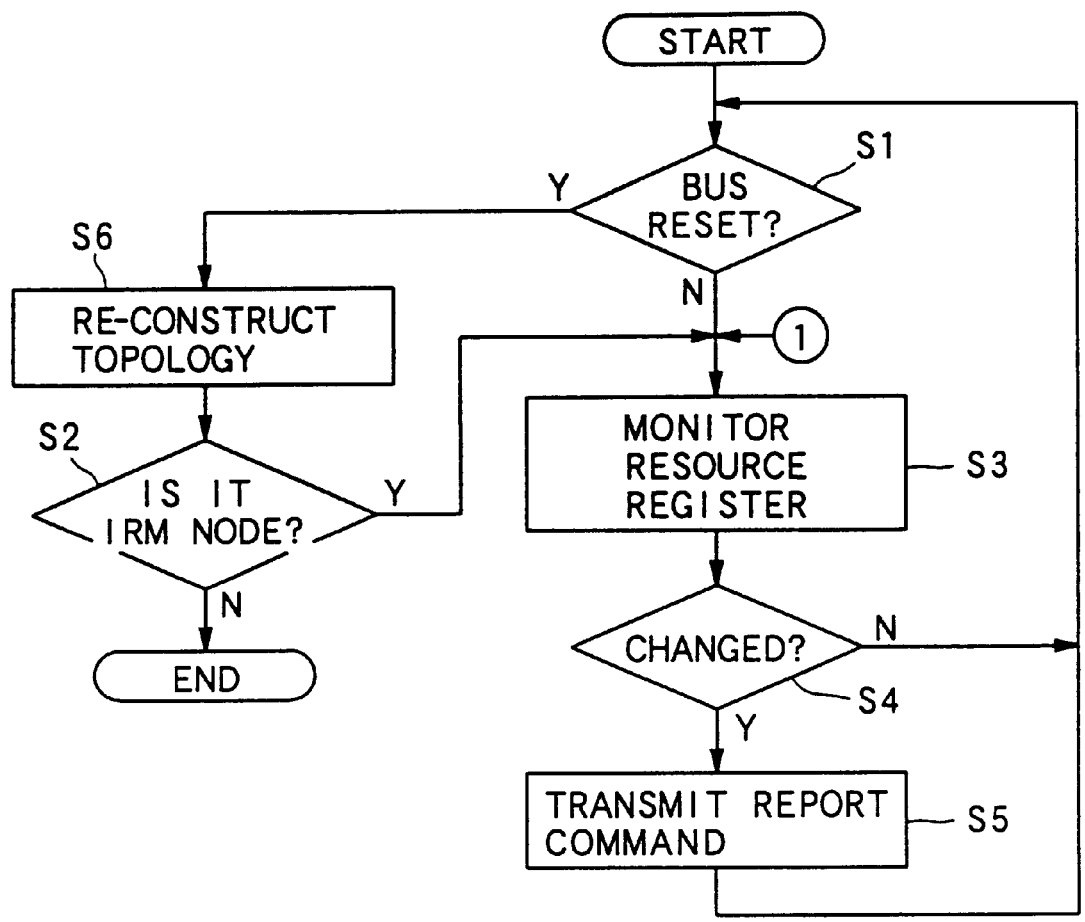
FIG. 7 is a flowchart showing processes in the IRM node of the first embodiment.
Figure 8:
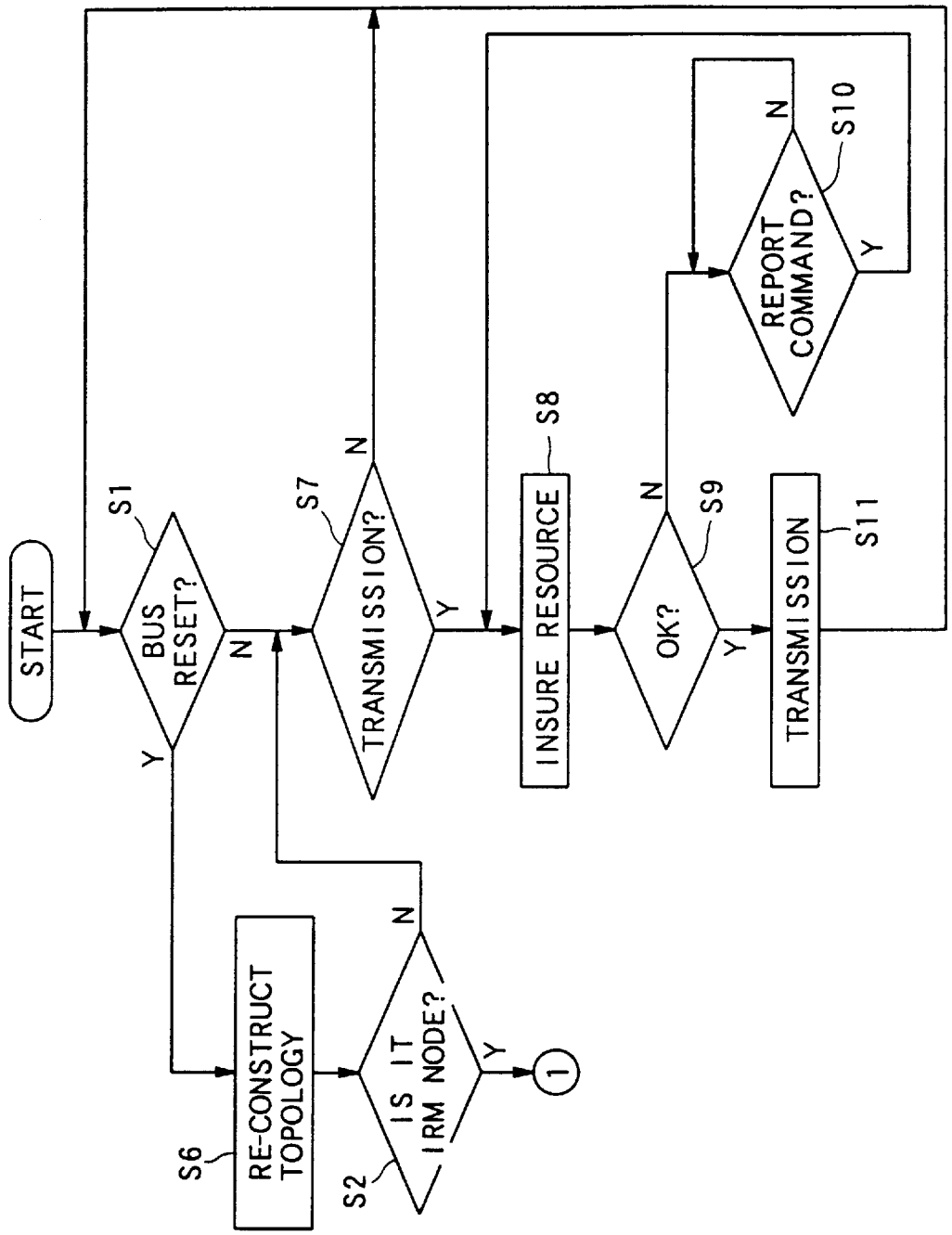
FIG. 8 is a flowchart showing processes in another node of the first embodiment.
Figure 9:
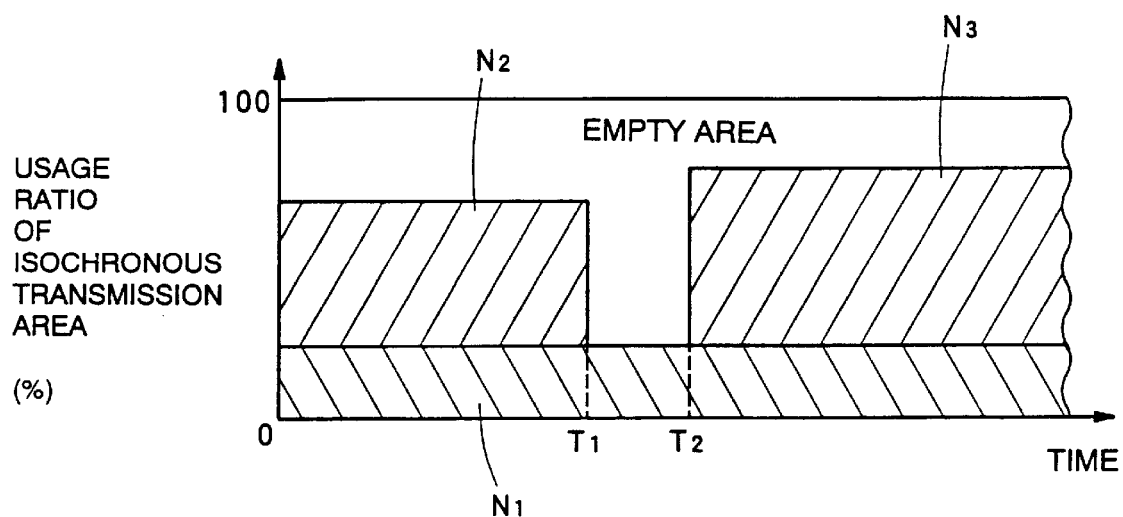
FIG. 9 is a timing chart exemplifying a manner of transmitting information in the first embodiment.

FIG. 4 is a block diagram showing the schematic configuration of an IRM node included in an information transmitting system of the first embodiment. FIG. 5 is a diagram describing the content of a later-described resource register in the IRM node. FIG. 6 is a block diagram showing the schematic configuration of another typical node included in the information transmitting system of the first embodiment. FIG. 7 is a flowchart showing the processes in the IRM node of the first embodiment. FIG. 8 is a flowchart showing the processes in another node of the first embodiment. FIG. 9 is a diagram describing the transmission of information in the first embodiment, in time series.

In the following description, only sections related to the information transmission according to the present invention in the information processors which are the respective nodes are described. For example, a CD player CP serving as the node has a configuration (mainly, a configuration for the information reproduction) as the CD player CP itself, in addition to a configuration described below.

At first, the configuration and the operations of the IRM node according to the present invention are described with reference to FIGS. 4 and 5.

As shown in FIG. 4, an IRM node NI serving as an indicating device in the first embodiment is provided with a packet transmitter 1, a transmission controller 2, a comparison register 3, a packet receiver 4 and a resource register 5 serving as a transmission state memory and a referring device memory.

Here, the resource register 5 is a register for storing a channel currently used on the serial bus B and a transmission occupation period currently being occupied, in a condition that they can be referred to on a list by other nodes.

Also, the transmission controller 2 is composed of a command generator 6 and a comparator 7 serving as a monitor.

The schematic operation will be described below.

At first, the packet receiver 4 receives reception data Srv from the serial bus B, in the normal information transmission, and then separates the above-mentioned video information and the like and a control information used to control the video information etc., from the reception data Srv, and further outputs it as input data Srd to a processor (not shown) (for example, a record processor for recording the video information inputted as the input data Srd if the IRM node NI is an MD player MP) of the IRM node NI (hereafter, the above-mentioned receiving process is referred to as a normal packet receiving process).

When a request referencing the contents (namely, the channel currently being used and the transmission occupation period currently being occupied) of the resource register 5 in order to start transmission of the information in the arbitration operation is transmitted from another node by using the asynchronous transmission area ACT, the packet receiver 4 receives this request, outputs the reference result to the packet transmitter 1, and again uses the asynchronous transmission area ACT to then transmits sends back) the reference result to the node transmitting the reference request. Also, when a request to reserve a channel and a transmission occupation period, respectively, to be used in the arbitration operation is transmitted from another node by using the asynchronous transmission area ACT, the pact receiver 4 outputs a write signal Swr to the resource register 5, in order to store into resource register 5 the channel and the transmission occupation period which are desired to be reserved.

Then, in the normal information transmission, the resource register 5 outputs the memory and display content as a normal register signal Srg2 to the comparator 7. On the other hand, the resource register 5 outputs the memory and display content as a register signal Srg1 to the comparison register 3 for each preset predetermined time duration (for example, 1 second), and then re-writes a content of the comparison register 3 into a content similar to the memory and display content of the resource register 5 for each predetermined time. In addition, if the write signal Swr is outputted by the packet receiver 4 in the arbitration operation, the resource register 5 updates the memory and display content, in accordance with its content.

When the transmission of the information is ended in one node, and the control information indicating that a channel used by the node and a transmission occupation period occupied by the node are released (namely, the usage and the occupation are ended) is transmitted by using the asynchronous transmission area ACT, a fact that a new empty channel is generated and also the occupied transmission occupation period is decreased is transmitted as a write signal Swr to the resource register 5. The memory and display content of the resource register 5 is updated also in this case.

Here, the inner configuration of the resource register 5 is described with reference to FIG. 5. As shown in FIG. 5, the memory area of the resource register 5 is provided with an occupation period memory 10 indicative of a transmission occupation period currently being occupied, and a channel memory 11 for storing and displaying a channel currently being used.

The occupation period memory 10 comprises a reserved area 10A in which data is not stored as a reservation, and a data area 10B indicative of a remaining transmission occupation period that is not currently occupied. At a given time, a maximum of the values stored in the data area 10B is stored and displayed if data is not sent or received on the serial bus B (namely, a remainder of the transmission occupation period is 100 μsec), as the memory and display manner of the data area 10B. After the transmissions of information are started by respective nodes, the transmission occupation period is gradually occupied by the respective nodes. Each time a part of the transmission occupation period is newly occupied by a certain node, the stored value is reduced correspondingly to the newly occupied transmission occupation period. Accordingly, a remaining transmission occupation period is stored and displayed that can be occupied by a node which tries to start transmitting information from now.

On the other hand, the channel memory 11 has 63 usage state memory areas 12 prepared for each channel allowed to be used on the serial bus standard. When any one of nodes newly starts using one channel, a value "0" is stored in a usage state memory area 12 corresponding to the channel being used. On the other hand, a value "1" is stored in a usage state memory area 12 corresponding to a non-used channel. Thus, the channel currently being used by any one of nodes is stored and displayed.

Next, in the normal information transmission, the comparison register 3 re-writes its memory content in accordance with a register signal Ssg1 for each above-mentioned predetermined time, and always outputs the memory content as a register signal Srg3 to the comparator 7 (hereafter, this process of the normal information transmission process is referred to as a "comparison buffer process").

Accordingly, the comparator 7 always compares the content of the register signal Srg2 from the resource register 5 with the content of the register signal Srg3 from the comparison register 3, in the normal information transmission. If a difference occurs between both the contents, the comparator 7 generates a comparison signal Scm indicative of the occurrence of the difference, and outputs it to the command generator 6.

As mentioned above, although the register signal Srg2 is always outputted by the resource register 5, the register signal Srg1 is outputted only for each above-mentioned predetermined time. On the other hand, the register signal Srg3 is always outputted to the comparator 7. After all, the case when the difference occurs between the content of the register signal Srg2 and the content of the register signal Srg3 in the comparator 7 implies the case when the content of the resource register 5 is re-written in accordance with the write signal Swr in the predetermined time duration. Thus, the generation of the comparison signal Scm is limited to the case when the resource register 5 is re-written (in other words, in a case of the occurrence of a channel to be newly used and the increase of the occupied transmission occupation period, or in a case of the occurrence of a new empty channel and the decrease of the occupied transmission occupation period).

Accordingly, the command generator 6 generates a report command to report to the respective nodes the fact that the content of the resource register 5 is re-written (namely, the states of the usage channel and the transmission occupation period are changed), in accordance with the comparison signal Scm from the comparator 7, and then outputs it as a command signal Sco to the packet transmitter 1.

The packet transmitter 1 inserts the command signal Sco into the asynchronous transmission area ACT, generates a transmission data Str, transmits it through the serial bus B to all other nodes, and then reports to the other nodes the change of the states of the transmission occupation period and the usage channel on the serial bus B.

In addition to this operation, in the arbitration operation, the packet transmitter 1 transmits the reference result of the resource register 5 to a node requesting the reference, by using the asynchronous transmission area ACT.

Moreover, in the normal information transmission, the packet transmitter 1 performs a predetermined packet process etc., with respect to an output data Sd (for example, an output data Sd including the audio information reproduced by the MD player MP, if the IRM node NI is the MD player MP) which is generated by other elements (not shown) of the IRM node NI and is to be outputted by the IRM node NI, to thereby form the isochronous packets IP and further transmits it onto the serial bus B (hereafter, this transmitting process in the normal information transmission is referred to as a "normal packet transmission process").

Next, the configuration and the operation of another node connected through the serial bus B to the IRM node NI will be described below with reference to FIG. 6.

As shown in FIG. 6, a general node N serving as the information processing apparatus in the first embodiment is provided with a packet transmitter 15 serving as a transmitter, a transmission controller 17 serving as an insuring unit and a packet receiver 16.

Next, the schematic operation will be described below.

At first, in the above-mentioned normal information transmission, the packet receiver 16 carries out a normal packet reception process similarly to the packet receiver 4 shown in FIG. 4.

Also, when referring to the content of the resource register 5 in order to start transmitting the information in the arbitration operation, the packet receiver 16 receives the reference result through the serial bus B and the packet transmitter 1 in the IRM node NI, and then transmits the result to a processor (not shown), so as to control an operation of newly insuring the above-mentioned channel and transmission occupation period.

Moreover, when receiving the command signal Sco indicative of the change of the states of the transmission occupation period and the usage channel on the serial bus B from the IRM node NI through the serial bus B, the packet receiver 16 generates a report signal Smg indicative of the changes, and further outputs it to the transmission controller 17.

Then, when the node N starts transmitting the information, the transmission controller 17 carries out the arbitration operation in accordance with the control of the processor (not shown), and then generates a request signal Sc of requesting a reference of the resource register 5 in the IRM node NI, and further outputs it to the packet transmitter 15. Also, if a channel and a transmission occupation period which the node N desires can be used as the reference result, the transmission controller 17 transmits the usable situation to the IRM node NI, and then updates the content of the resource register 5 (namely, the channel and the transmission occupation period which the node N newly uses are stored in the resource register 5).

As described later, the transmission controller 17 carries out a reference request operation to the IRM node NI one time. As a result, if it is understood that the channel and the transmission occupation period desired by the node N can not be used, the transmission controller 17 does not carry out a new reference request operation until receiving the command signal Sco indicative of the changes of the states of the usage channel and the transmission occupation period on the serial bus B from the IRM node NI.

Due to this operation of the transmission controller 17, the packet transmitter 15 inserts into the asynchronous transmission area ACT the control signal of requesting the reference of the resource register 5, in the arbitration operation, and then generates the transmission data Str, and further transmits it through the serial bus B to the IRM node NI.

After the reference request operation is once executed, the control signal of requesting the reference is never transmitted until the command signal Sco indicative of the change of the states of the usage channel and the transmission occupation period on the serial bus B is newly received, in accordance with a control signal Sc from the transmission controller 17.

In addition to them, the packet transmitter 15 carries out the normal packet transmission process in the normal information transmission.

Next, the operations of the IRM node NI and the node N will be detailed below in time series with reference to flowcharts shown in FIGS. 7 and 8. In the flowchart shown in FIG. 8, the similar step numbers are given to the operations identical to those of the flowchart shown in FIG. 7, and the explanations of the detailed portions are omitted.

At first, the operations of the IRM node NI are described with reference to FIG. 7.

In the IRM node NI of the first embodiment, it is firstly monitored whether or not a bus reset occurs on the serial bus B (Step S1). If the bus reset occurs (Step S1: YES), a topology is newly constructed (Step S6). Next, it is checked whether or not in the reconstructed topology, it becomes an IRM node by itself (Step S2). Then, if it does not become the IRM node (Step S2: NO), the process ends as it is. On the other hand, if it becomes the IRM node (Step S2: YES), the operational flow proceeds to the step S3 in order to continue the process as the IRM node.

On the contrary, if the bus reset does not occur (Step S1: NO), then, a memory and display content is monitored (Steps S3 and S4). Actually, in the operations at the steps S3 and S4, the comparator 7 always compares the content of the register signal Ssg2 from the resource register 5 with the content of the register signal Ssg3 from the comparison register 3, and accordingly monitors whether or not the difference occurs between both of the contents.

If the memory and display content of the resource register 5 is changed during the monitor (Step S3) (Step S4: YES), a report command indicative of the change is transmitted as a command signal Sco to another node N (Step S5), and the operational flow again returns to the step S1, and the above-mentioned processes are repeated:

On the other hand, if the memory and display content of the resource register 5 is not changed in the judgment at the step S4 (Step S4: NO), the operational flow returns back to the step S1 as it is without generating the report command. Then, the above-mentioned operations are repeated.

The operations of the general node N other than the IRM node NI will be described below with reference to FIG. 8.

The node N of the first embodiment firstly carries out the operations at the steps S1, S2 and S6 shown in FIG. 7. In addition, in FIG. 8, after the re-constitution of the topology (Step S6), if it becomes the IRM node (Step S2: YES), the operational flow proceeds to the step S3 in FIG. 7, in order to carry out the process as the IRM node shown in FIG. 7.

On one hand, if the bus reset does not occur (Step S1: NO), or if it is not the IRM node (Step S1: NO), it is then checked whether or not the information is to be transmitted from the node N (Step S7). If there is no information to be transmitted (Step S7: NO), the operational flow returns back to the step S1 as it is, and the above-mentioned operations are repeated. On the other hand, if there is the information to be transmitted (Step S1: YES), the content of the resource register 5 is referred as the arbitration operation, and also an operation for insuring a channel and a transmission occupation period which the node N desires for the information transmission is carried out (hereafter, the channel and the transmission occupation period on the serial bus B are typically referred to as a "resource") (Step S8).

Then, it is judged whether or not the resource can be insured (namely, whether or not the desired channel is empty and further the desired transmission occupation period can be insured) (Step S9). If it can be insured (Step S9: YES), the insured channel and transmission occupation period are used to transmit the information (Step S11). After that, the operational flow again returns to the step S1, and the above-mentioned processes are repeated.

On the other hand, if the desired resource cannot be insured in the judgment at the step S9 (Step S9: NO), it is next checked whether or not a command signal Sco corresponding to the report command is received from the IRM node NI (Step S10). If it is not received (Step S10: NO), the operational flow waits until the reception. If it is received (Step S10: YES), the operational flow again returns to the step S8, and the operation of insuring the resource is again carried out. As a result, if the desired resource can be insured in accordance with the content of the re-written resource register 5 (Step S9: YES), the transmission of the information is started as it is (Step S11). On the other hand, if it cannot be insured (Step S9: NO), the operation of waiting for the arrival of the report command and again insuring the resource is repeated.

When the above-mentioned operations are considered in time series, as shown in FIG. 9, if a certain node N1 and another node N2 respectively use the desired channels and transmission occupation periods to then transfer the information, the resource register 5 is re-written at a time T1 when the transmission of the information from the node N2 is ended. Accordingly, a report command indicative of the re-written fact is transmitted to all other nodes N. Then, in accordance with the memory and display content of the re-written resource register 5, a node N3 which can insure a new resource uses the desired channel and transmission occupation period from a time T2, and then starts transmitting the information.

As mentioned above, according to the operations of the IRM node NI and the node N of the first embodiment, when the memory and display content of the resource register 5 in the IRM node NI is updated, the updated fact is reported through the serial bus B to another node N. Thus, the repetition of the useless or vain operation of insuring the resource can be avoided in the period while the memory content is not updated in each node N.

Thus, in view of the entire serial bus B, it is possible to avoid the serial bus B from being used for the useless or vain operation of insuring the resource in the period when the memory content of the resource register 5 is not updated, and accordingly it is possible to improve the usage efficiency of the serial buses as a whole. Hence, the information can be effectively transmitted.

The first embodiment may be designed as follows. That is, the IRM node NI stores a content of a resource requested by another node N. Then, if its desired resource is empty as an updated result of a content of the resource register 5, its fact is reported to the desired node N.

Also, in the first embodiment, the case is described in which when the memory and display content of the resource register 5 is updated, the report command is transmitted to all other nodes N. However, other than this case, the following manner may be considered. That is, an ID number (identification number) of a node N, which cannot insure a resource although it tries to refer to the memory and display content of the resource register 5, is stored in a part of a memory area in the resource register 5. Then, if the memory and display content of the resource register 5 is updated, a command signal Sco corresponding to the report command is transmitted only to the node N whose ID number is stored. Accordingly, the update of the memory and display content of the resource register 5 is reported only to the node N.

In this case, in addition to the effect of the above mentioned first embodiment, since the update of the memory and display content of the resource register 5 is reported only to the node N, which cannot insure the resource and cannot transmit the information, the transmission of the information can be effectively managed in the information transmitting system including the serial bus B.

(III) Second Embodiment

A second embodiment which is another embodiment of the present invention executed in accordance with the serial bus standard will be described below with reference to FIGS. 10 and 11.

Figure 10:
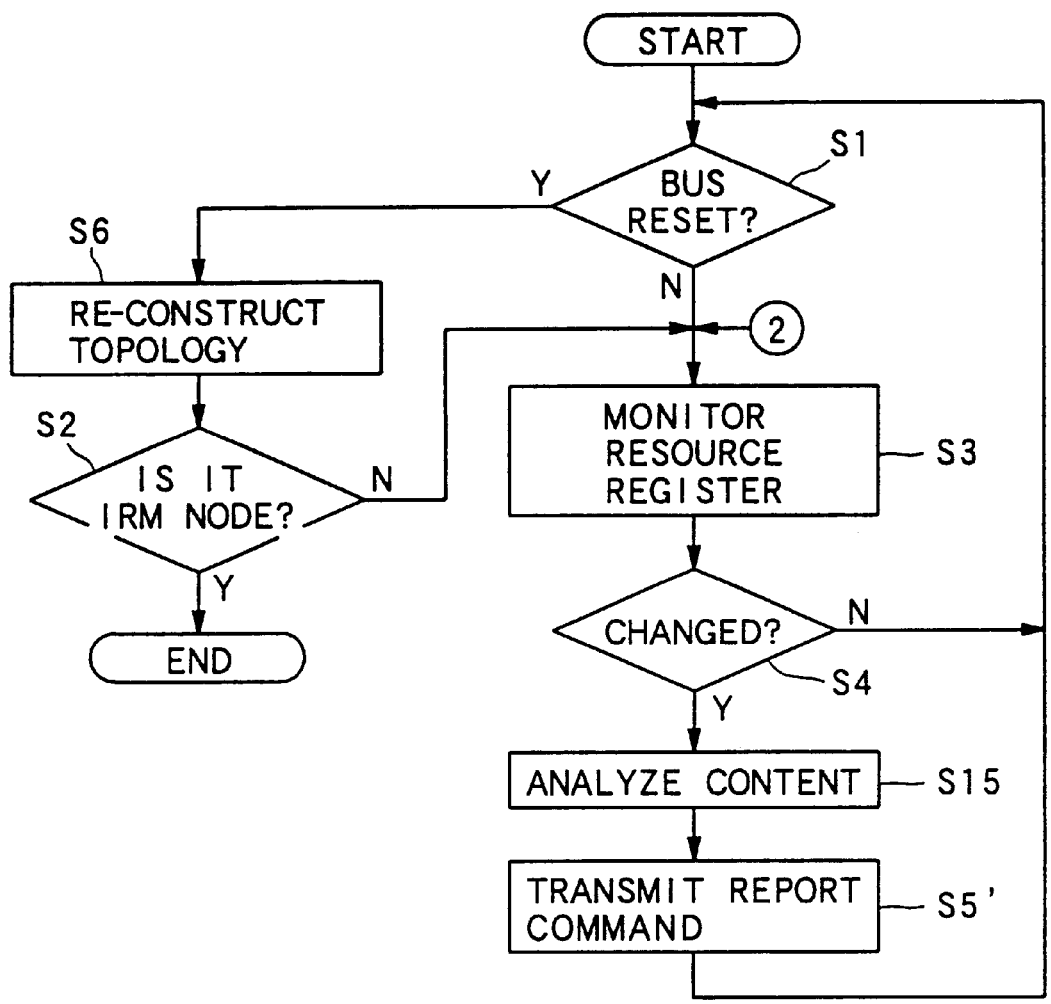
FIG. 10 is a flowchart showing processes in an IRM node of a second embodiment.
Figure 11:
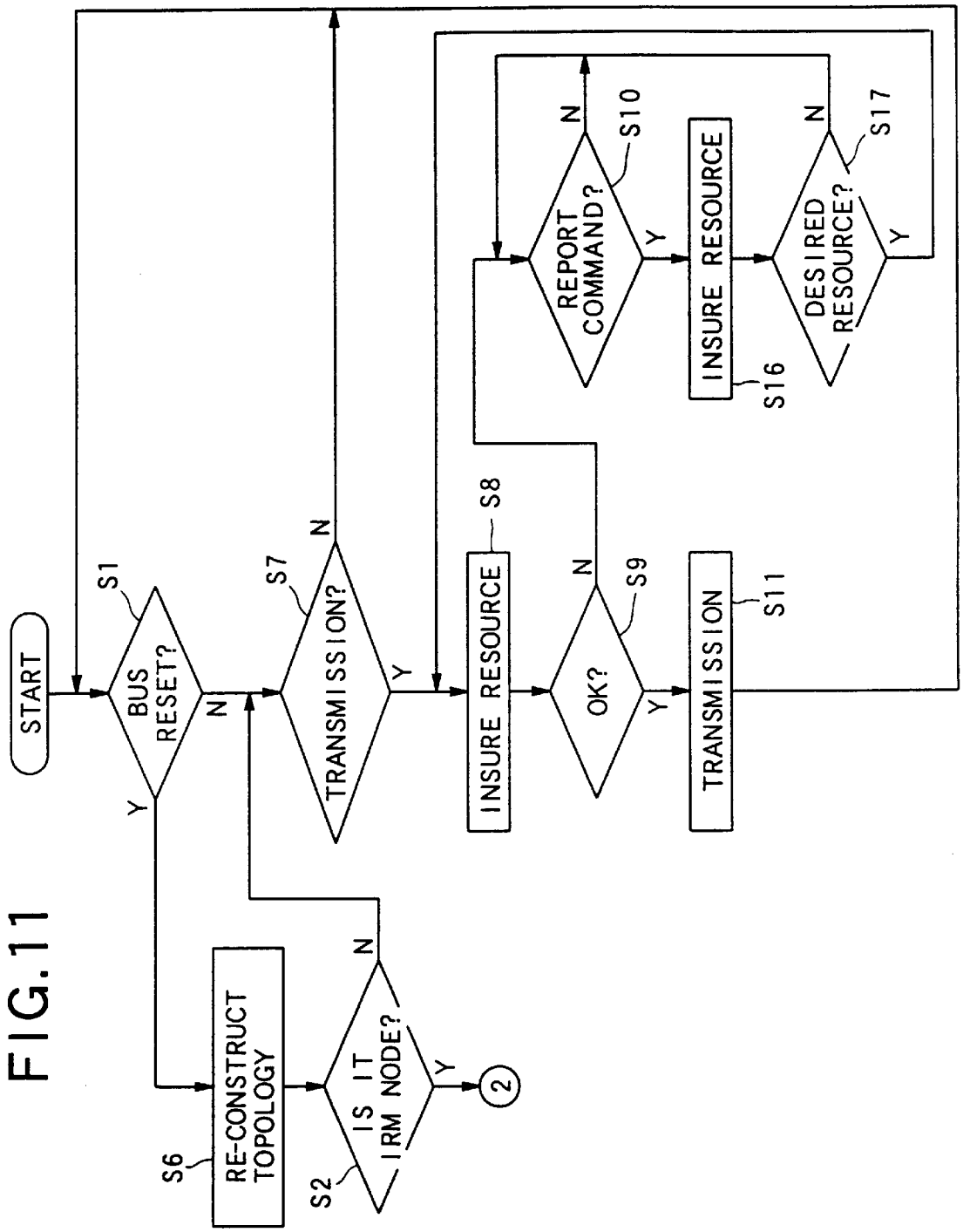
FIG. 11 is a flowchart showing processes in another node of the second embodiment.

FIG. 10 is a flowchart showing the processes in an IRM node of the second embodiment, and FIG. 11 is a flowchart showing the processes in another node of the second embodiment.

In the above described first embodiment, the IRM node NI reports only the fact of the update in the memory and display content of its resource register 5 to another node N. However, in the second embodiment, the IRM node reports the content of the resource register 5 after the update, in addition to the fact of the update in the memory and display content of the resource register 5.

In addition, the configurations of the IRM node and other typical nodes in the second embodiment are basically similar to those of the IRM node NI and the nodes N in the first embodiment. Thus, the explanations thereof are omitted. Only the operations as the second embodiment will be described below. Also, in the flowcharts in FIGS. 10 and 11, the similar step numbers are given to the operations similar to the flowcharts shown in FIGS. 7 and 8, and the explanations of the detailed portions are omitted.

At first, the operations of the IRM node in the second embodiment are described with reference to FIG. 10.

As shown in FIG. 10, the operations at the steps S1 to S4 and S6 in the operations (refer to FIG. 7) of the IRM node NI in the first embodiment are firstly executed in the IRM node NI in the second embodiment.

Then, if the memory and display content of the resource register 5 is updated (Step S4: YES), the comparator 7 serving as a detector next analyzes a non-occupied transmission occupation period and an empty channel after the update, in accordance with a content of the register signal Ssg2 (Step S15).

After the analysis, the analysis result (namely, a number of the empty channel and a length of the non-occupied transmission occupation period) is added to the report command, and it is transmitted as the command signal Sco to another node N (Step S5'). Again, the operational flow returns back to the step S1, and the above-mentioned processes are repeated.

Next, the operations of the general nodes other than the IRM node in the second embodiment will be described below with reference to FIG. 11.

As shown in FIG. 11, the processes at the steps S1, S2 and S6 to S11 in the operations (refer to FIG. 8) of the node N in the first embodiment are executed in the node of the second embodiment.

If the report command (which includes the actual number of the empty channel and the actual length of the non-occupied transmission occupation period after the update, in addition to the fact of update in the memory and display content of the resource register 5, as mentioned above) is received from the IRM node of the second embodiment (Step S10: YES), the transmission controller 17 next analyzes the content of the report command to thereby check an empty resource (namely, the actual number of the empty channel and the actual length of the non-occupied transmission occupation period after the update) (Step S16). Moreover, it is judged whether or not a channel and a transmission occupation period desired by a node transmitting the information can be insured in the checked empty resource (Step S17). If the desired resource can be insured (Step S17: YES), the operational flow proceeds to the step S8, and the resource is insured (Steps S8, S9: YES). So, the information transmission is started (Step S11).

On the other hand, if it is judged in the judgment at the step S17 that the resource desired by the node is not empty in the empty resource included in the report command (Step S17: NO), the operational flow returns back to the step S10 as it is, and waits until a next report command is transmitted from the IRM node in the second embodiment.

As mentioned above, according to the operations of the IRM node and the other nodes in the second embodiment, if the memory and display content of the resource register 5 is updated, the detected empty resource together with the fact of the update is reported to the other nodes, in addition to the effect due to the operations of the IRM node NI and the nodes N in the first embodiment. Thus, the node, which can not transmit the information, can quickly insure the empty resource to then start transmitting the information.

In the second embodiment, the configuration similar to that of the first embodiment enables the fact of the change in the resource register 5 and the empty resource to be reported only to a node which cannot insure a resource although it refers to the resource register 5.

(IV) Third Embodiment

A third embodiment which is another embodiment of the present invention executed in accordance with the serial bus standard will be described below with reference to FIGS. 12 and 13.

Figure 12:
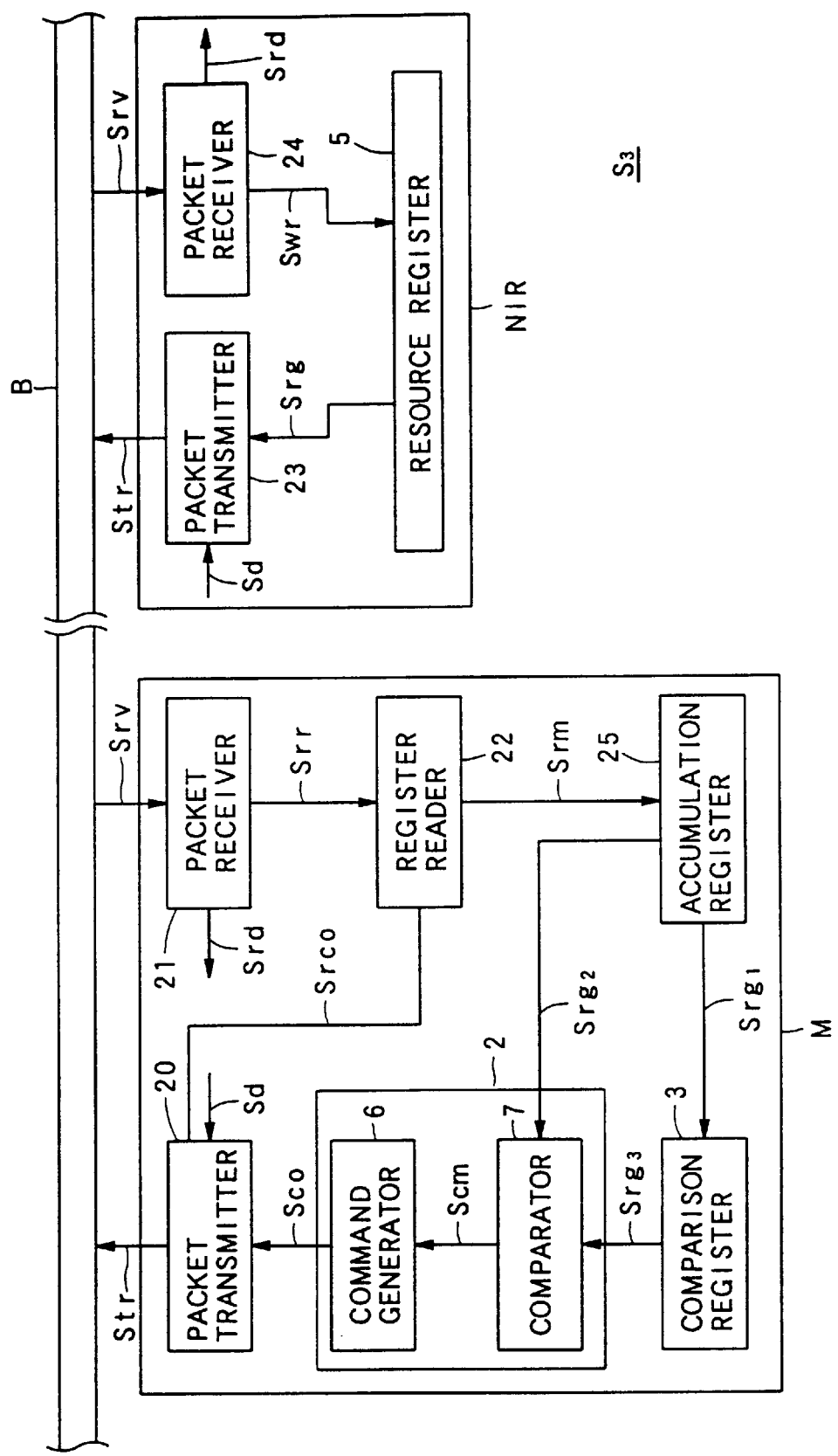
FIG. 12 is a block diagram showing a configuration of each node of a third embodiment.
Figure 13:
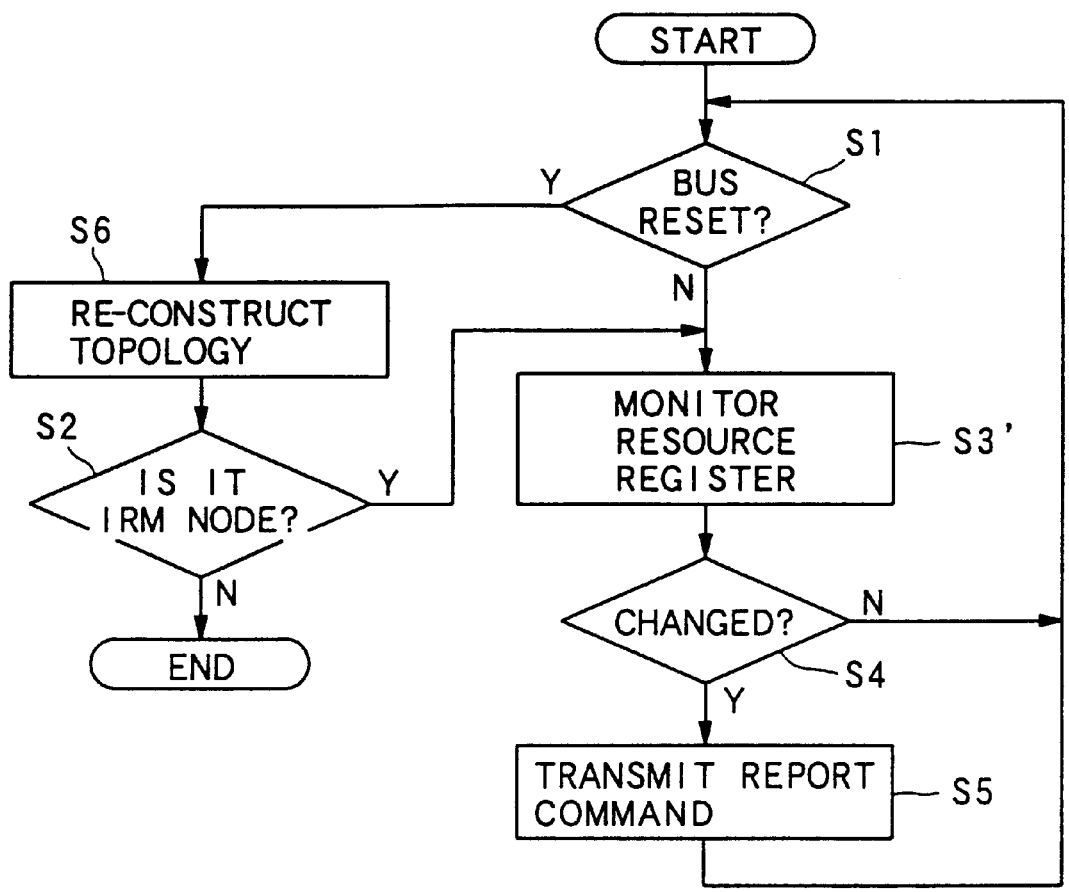
FIG. 13 is a flowchart showing processes in an IRM node of the third embodiment.

FIG. 12 is a block diagram showing the configuration of each node of the third embodiment, and FIG. 13 is a flowchart showing the processes in a management node of the third embodiment.

In the first and second embodiments, the IRM node having the resource register 5 transmits the report command indicative of the fact of the update in the memory and display content of the resource register 5 and the like, to the other nodes. However, in the third embodiment, the management node which is a node different from the IRM node has the reporting function.

At first, the configuration and the operation of a node included in an information transmitting system S3 of the third embodiment is described with reference to FIG. 12. In FIG. 12, the similar member numbers are given to the members similar to the respective members in the first or second embodiment. Thus, the explanations of the detailed portions are omitted.

The configuration of the IRM node included in the information transmitting system S3 of the third embodiment is firstly described.

As shown in FIG. 12, an IRM node NIR of the third embodiment has the configuration similar to the IRM node typically defined on the serial bus standard, and it is actually provided with a resource register 5, a packet receiver 24 and a packet transmitter 23 similar to the case of the first or second embodiment.

Next, the operations will be described below.

At first, the packet receiver 24 carries out the above-mentioned normal packet reception process, in the normal information transmission.

When a request of referring to a content of the resource register 5 in order to start transmitting the information in the arbitration operation is transmitted from another node by using the asynchronous transmission area ACT, the packet receiver 24 receives this request, outputs the reference result as a register signal Srg to the packet transmitter 23, and then transmits (sends back) to the node transmitting the reference request. Also, when a request to insure a channel and a transmission occupation period, respectively, to be used by it in the arbitration operation is transmitted from another node by using the asynchronous transmission area ACT, the packet receiver 24 outputs a write signal Swr to the resource register 5, in order to store in the resource register 5 the channel and the transmission occupation period which are desired to be insured.

On the other hand, the packet transmitter 23 carries out the above-mentioned normal packet transmission process in the normal information transmission.

In addition to it, the packet transmitter 23 transmits the register signal Srg which is the reference result of the resource register 5, as the transmission data Str, to the node requesting the reference by using the asynchronous transmission area ACT, in the arbitration operation.

Moreover, when a read out request signal Srco is transmitted by a later-described management node M in order to read out a memory and display content of the resource register 5, the packet receiver 24 receives the read out request signal Srco. Accordingly, the packet transmitter 23 reads out the memory and display content of the resource register 5 as the register signal Srg, and then transmits it to the management node M as the transmission data Str.

The configuration of the management node M included in the information transmitting system S3 of the third embodiment will be described below.

As shown in FIG. 12, the management node M of the third embodiment is provided with the transmission controller 2 and the comparison register 3 similar to those of the IRM node NI in the first or second embodiment, a packet transmitter 20, a packet receiver 21, a register reader 22 and an accumulation register 25.

Next, the operations will be described below.

At first, the packet receiver 21 carries out the above-mentioned normal packet reception process in the normal information transmission.

In parallel with this, when the memory and display content of the resource register 5 is transmitted by the IRM node NIR in accordance with a read out request signal Srco from the register reader 22, the packet receiver 21 outputs the content as a content data Srr to the register reader 22.

Next, the register reader 22 generates the read out request signal Srco, for example, at a rate of one time for each 10 isochronous cycles IC, as described later, and then outputs it as the transmission data Str through the packet transmitter 20 to the IRM node NIR. Also, if the memory and display content of the resource register 5 is transmitted correspondingly to the outputted read out request signal Srco and then it is inputted as the content data Srr, the register reader 22 outputs it as a write signal Srm as it is to the accumulation register 25. Accordingly, the content of the resource register 5 is copied as it is to the accumulation register 25, for each 10 isochronous cycles IC.

Then, the accumulation register 25 outputs its memory and display content as a normal register signal Srg2 to the comparator 7. On the other hand, the accumulation register 25 outputs its memory and display content as a register signal Srg1 to the comparison register 3 for each preset predetermined time (for example, 1 second), and then re-writes a content of the comparison register 3 into a content similar to the memory and display content of the accumulation register 25 for each predetermined time.

Accordingly, when a control signal indicating that the transmission of the information is ended in another one node and then a channel used by the node and a transmission occupation period occupied by the node are released is transmitted to the IRM node NIR by using the asynchronous transmission area ACT, the IRM node NIR transmits a fact that a new empty channel is generated and also the occupied transmission occupation period is decreased, as a write signal Swr to the resource register 5. So, the memory and display content of the resource register 5 is updated, and the memory and display content of the accumulation register 25 is also updated at the substantially same time.

Next, the comparison register 3 carries out the comparison buffer process similar to that of the first embodiment.

Accordingly, the comparator 7 always compares a content of the register signal Srg2 from the accumulation register 25 with the content of the register signal Srg3 from the comparison register 3, in the normal information transmission similarly to the case of the first embodiment. If a difference occurs between those two contents, the comparator 7 generates a comparison signal Scm indicative of the occurrence of the difference, and then outputs it to the command generator 6.

Here, as mentioned above, the case when the difference occurs between the content of the register signal Srg2 and the content of the register signal Srg3 in the comparator 7 implies the case when the content of the accumulation register 25 (in other words, the resource register 5) is re-written in the predetermined time. Thus, the generation of the comparison signal Scm is limited to the case when the accumulation register 25 is re-written (in other words, in the case when a channel to be newly used is generated and the occupied transmission occupation period is increased, or in the case when a new empty channel is generated and the occupied transmission occupation period is decreased).

Accordingly, the command generator 6 generates the report command to report to the respective nodes the fact that the content of the accumulation register 25 is re-written (namely, the states of the usage channel and the transmission occupation period are changed), in accordance with the comparison signal Scm from the comparator 7, similarly to the case of the first embodiment, and then outputs it as a command signal Sco to the packet transmitter 20.

When the read out request signal Srco is transmitted by the register reader 22, the packet transmitter 20 transmits it as the transmission data Str to the IRM node NIR. Also, when receiving the command signal Sco from the command generator 6, the packet transmitter 20 inserts the command signal Sco into the asynchronous transmission area ACT, generates the transmission data Str and transmits it through the serial bus B to all other nodes, so as to report to the other nodes the changes of the states of the transmission occupation period and the usage channel on the serial bus B.

In addition to this operation, the packet transmitter 20 carries out the normal packet transmission process in the normal information transmission.

Next, the operations of the management node M and the IRM node NIR will be collectively detailed below in time series with reference to a flowchart shown in FIG. 13. In the flowchart shown in FIG. 13, the similar step numbers are given to the operations identical to those of the flowchart shown in FIG. 7, and the explanations of the detailed portions are omitted.

The operations at the steps S1, S2 and S6 similar to the operations (refer to FIG. 7) in the IRM node NI of the first embodiment are executed in the management node M of the third embodiment.

Next, the memory and display content of the resource register 5 is monitored (Steps S3' and S4). Actually as for the processes at the steps S3' and S4, the register reader 22 firstly generates the read out request signal Srco, for example, for each 10 isochronous cycles IC to then output it to the IRM node NIR. Accordingly, the content of the resource register 5 is transferred from the IRM node NIR through the packet receiver 21 and the register reader 22 to the accumulation register 25. In parallel with this transfer operation for each 10 isochronous cycles, the comparator 7 carries out the process of always comparing the content of the register signal Ssg2 from the accumulation register 25 with the content of the register signal Ssg3 from the comparison register 3, so as to monitor whether or not the difference occurs between those two contents.

If the memory and display content of the accumulation register 25 (namely, the resource register 5) is changed during the monitor (Step S3') (Step S4: YES), the report command indicative of the change is transmitted as the command signal Sco to another node N (Step S5), and the operational flow again returns to the step S1, and the above-mentioned processes are repeated.

In addition, the configuration of the typical node other than the IRM node NIR and the management node M in the information transmitting system S3 of the third embodiment is perfectly similar to that of the node N in the first embodiment. Moreover, the processes thereof are perfectly similar to those of the node N in the first embodiment except that the transmission source of the report command is the management node M. Thus, the explanations of the detailed portions are omitted.

As mentioned above, according to the operations of the IRM node NIR and the management node M in the third embodiment, even if the node, which monitors the resource register 5 and reports the update, is the node different from the IRM node NIR having the resource register 5, it can provide the effect similar to that of the first embodiment.

In addition, the third embodiment may be designed as follows. That is, as the process until one of nodes becomes the management node M after the re-configuration of topology, for example, if a certain node has a function as the management node M, at a time of the re-configuration of the topology, when its ID number is transmitted onto the serial bus B, a flag indicative of its fact is added. After that, after the ID numbers are given to all the nodes, a node having the largest ID number among the nodes sending out the flag is defined as the management node M.

Moreover, as a method of determining the management node M other than this method, for example, there are the following methods and the like.

(i) The management node M is randomly determined from among the nodes sending out the above-mentioned flag.

(ii) A node which firstly sends out the flag is defined as the management node M.

(iii) The IRM node NIR designates the management node M from among the nodes sending out the flag.

(iv) Any one of nodes connected to the IRM node NIR becomes the management node M, among the nodes sending out the flag In the third embodiment, the case is described in which when the memory and display content of the resource register 5 is updated, the report command is transmitted to all other nodes except the management node M. However, other than this case, the following manner may be considered. That is, an ID number of a node, which cannot insure a resource although the node tries to refer to a memory and display content of a resource register 5, is stored in a part of the memory area of the resource register 5. Then, the ID number together with the memory and display content of the resource register 5 is read out to transfer them to the accumulation register 25. So, a command signal Sco corresponding to the report command is transmitted only to the node whose ID number is stored. Accordingly, the fact of the update in the memory and display content of the resource register 5 is reported only to the node.

As a method for recognizing the node which cannot insure the resource in the management node M, the following method may be considered other than the above-mentioned manner. For example, when a node tries to insure a resource for an IRM node NI, the IRM node NI makes the node insuring the resource recognize the ID number of the management node M. After this recognition, the information can be sent and received between the management node M and its node. Also, at a time of setting the management node M, if the ID number of the management node M is recognized by another node, it is enough that the node requesting the insurance of the resource directly reports its request to the management node M.

(V) Fourth Embodiment

A fourth embodiment which is another embodiment of the present invention executed in accordance with the serial bus standard will be described below with reference to FIG. 14.

Figure 14:
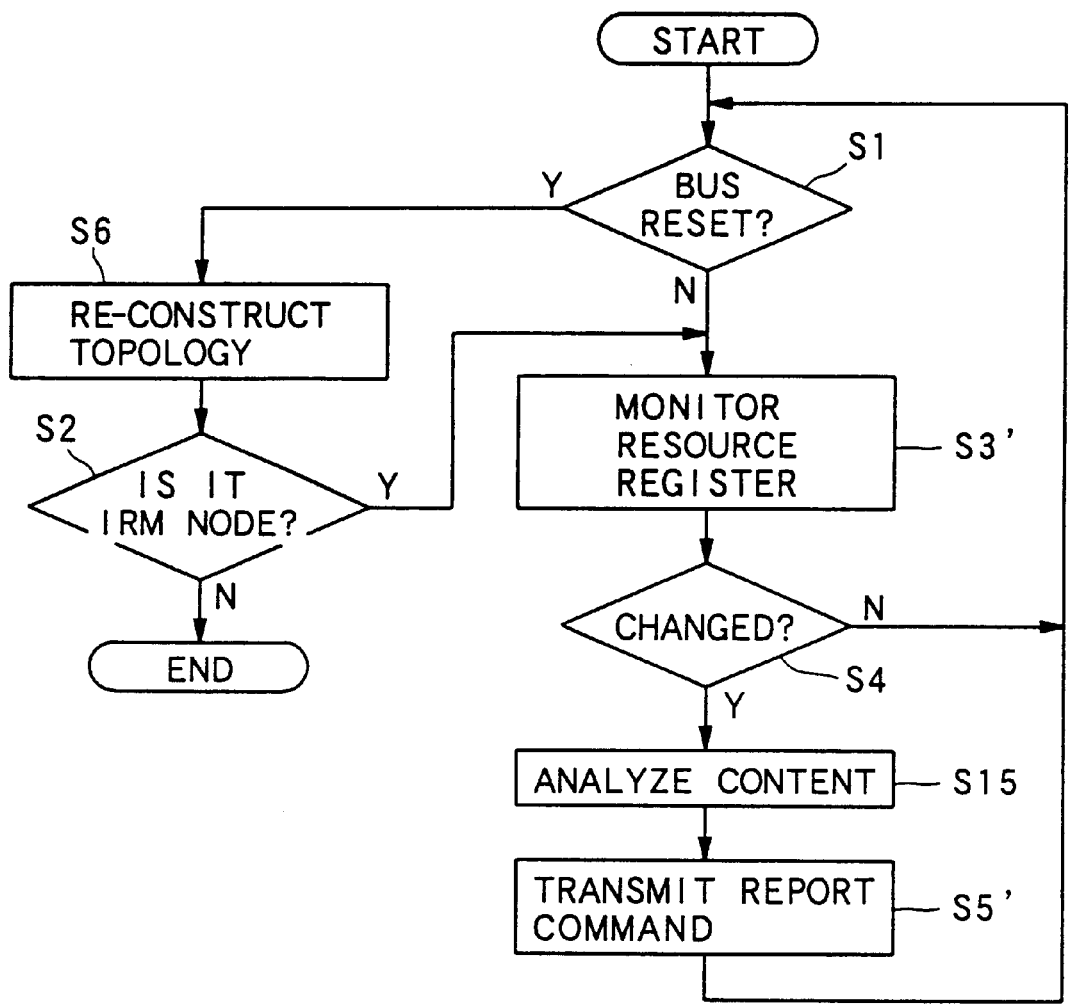
FIG. 14 is a flowchart showing processes in an IRM node of a fourth embodiment.

FIG. 14 is a flowchart showing the processes in an IRM node and a management node of the fourth embodiment.

In the third embodiment, the management node M reports to the other nodes N only the fact of the update in the memory and display content of the resource register 5 in the IRM node NIR. However, in the fourth embodiment, the management node reports a content of the resource after the update, in addition to the fact of the update in the memory and display content of the resource register 5 in the IRM node.

The configurations of the management node, the IRM node and the other general nodes in the fourth embodiment are basically similar to those of the management node M and the IRM node NIR in the third embodiment and the general nodes in the second embodiment. Thus, the explanations thereof are omitted. Only the operations as the fourth embodiment will be described below. Also, in the flowchart shown in FIG. 14, the similar step numbers are given to the operations similar to those of the flowchart shown in FIG. 10, and the explanations of the detailed portions are omitted.

As shown in FIG. 14, the operations at the steps S1 to S4 and S6 in the operations (refer to FIG. 13) of the IRM node NIR in the third embodiment are firstly executed in the management node and the IRM node in the fourth embodiment.

If the memory and display content of the accumulation register 25 (namely, the resource register 5) is updated (Step S4 YES), the transmission controller 2 next analyzes a non-occupied transmission occupation period and an empty channel after the update, in accordance with a content of the register signal Ssg2 (Step S15).

After the analysis, the number of the empty channel and the length of the non-occupied transmission occupation period, which is the analysis result, is added to the report command, and they are transmitted as the command signal Sco to another node N (Step S5'). Again, the operational flow returns to the step S1, and the above-mentioned processes are repeated In addition, the processes of the general nodes other than the IRM node and the management node in the information transmitting system of the fourth embodiment are perfectly similar to those of the other nodes other than the IRM node in the second embodiment except that the transmission destination of the report command including the number of the empty channel and the length of the non-occupied transmission occupation period is the management node. Thus, the explanations of the detailed portions are omitted.

As mentioned above, according to the operations of the management node, the IRM node and the other nodes in the fourth embodiment, if the memory and display content of the resource register 5 is updated, the detected empty resource together with the fact of the update is reported to the other nodes, in addition to the effect due to the operations of the management node M, the IRM node NI and the other nodes in the third embodiment. Thus, the node, which cannot transmit the information, can quickly insure the empty resource to then start transmitting the information.

In the fourth embodiment, the configuration similar to that of the third embodiment enables the fact of the change in the resource register 5 and the empty resource to be reported only to a node which cannot insure a resource although it refers to the resource register 5.

The fourth embodiment may be designed such that the IRM node stores a content of a resource requested by another node, and if its desired resource becomes empty as an updated result of a content of the resource register 5, the IRM node reports the fact to the desiring node.

(VI) Fifth Embodiment

A fifth embodiment which is another embodiment of the present invention executed in accordance with the serial bus standard will be described below with reference to FIGS. 15 to 19.

Figure 15:
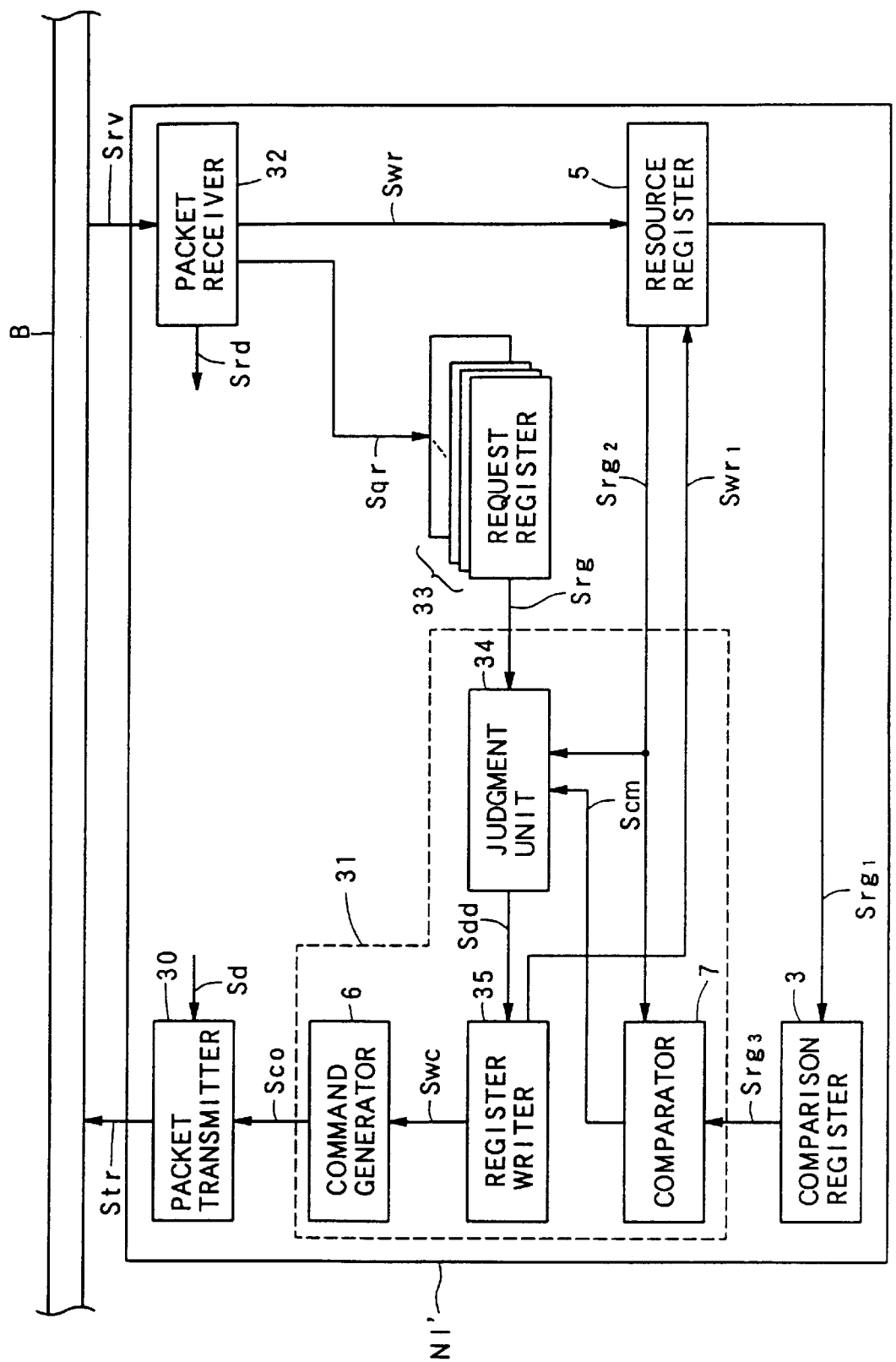
FIG. 15 is a block diagram showing a configuration of an IRM node of a fifth embodiment.
Figure 16:
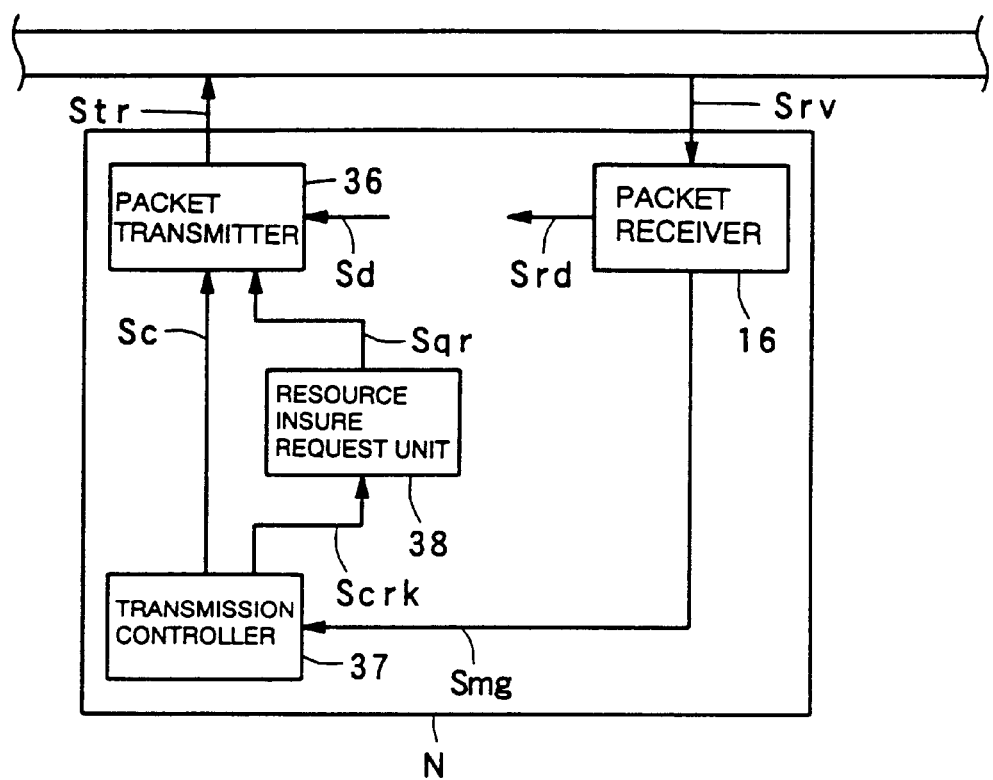
FIG. 16 is a block diagram showing a configuration of another node of the fifth embodiment.
Figure 17:
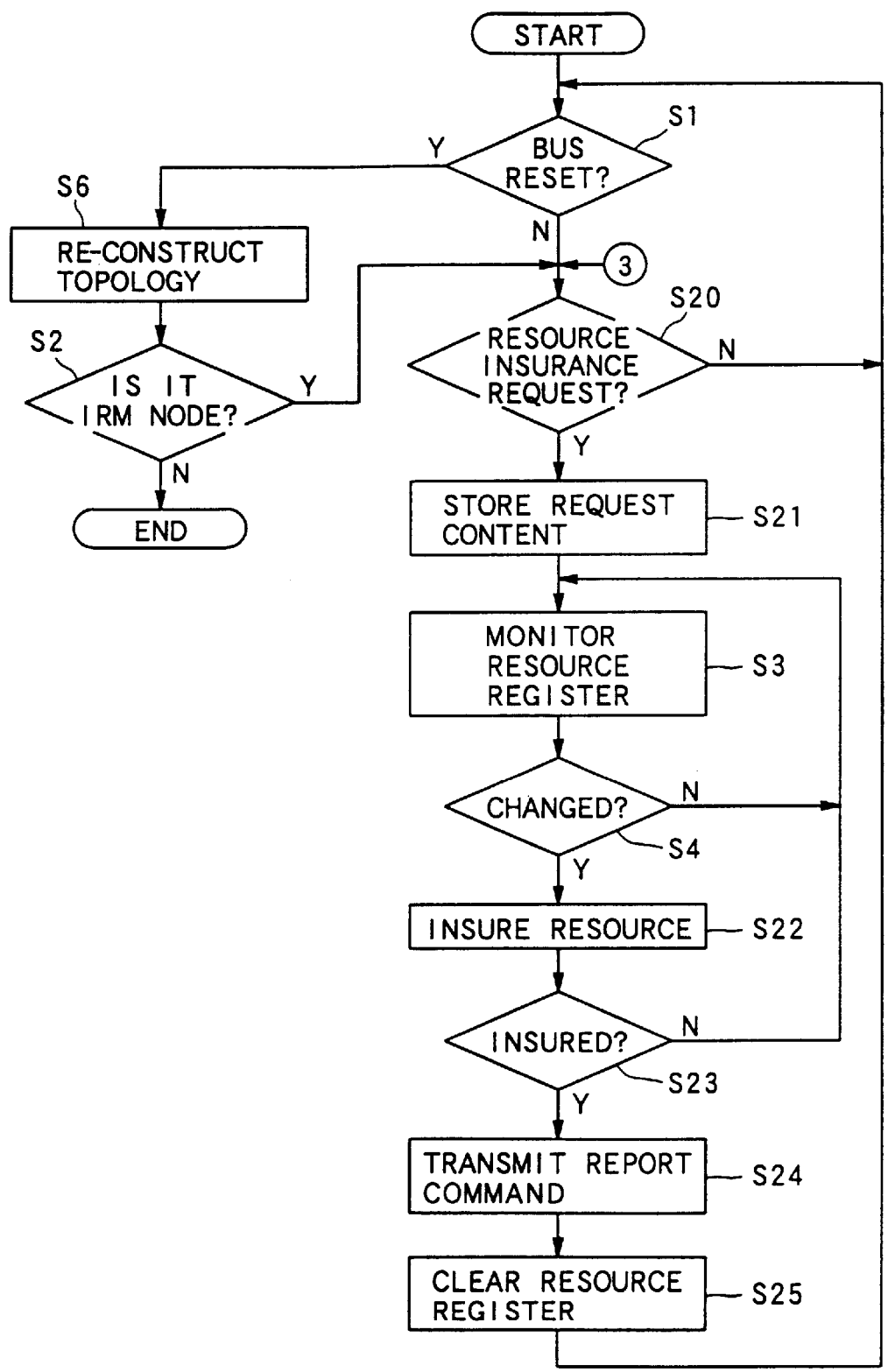
FIG. 17 is a flowchart showing processes in the IRM node of the fifth embodiment.
Figure 18:
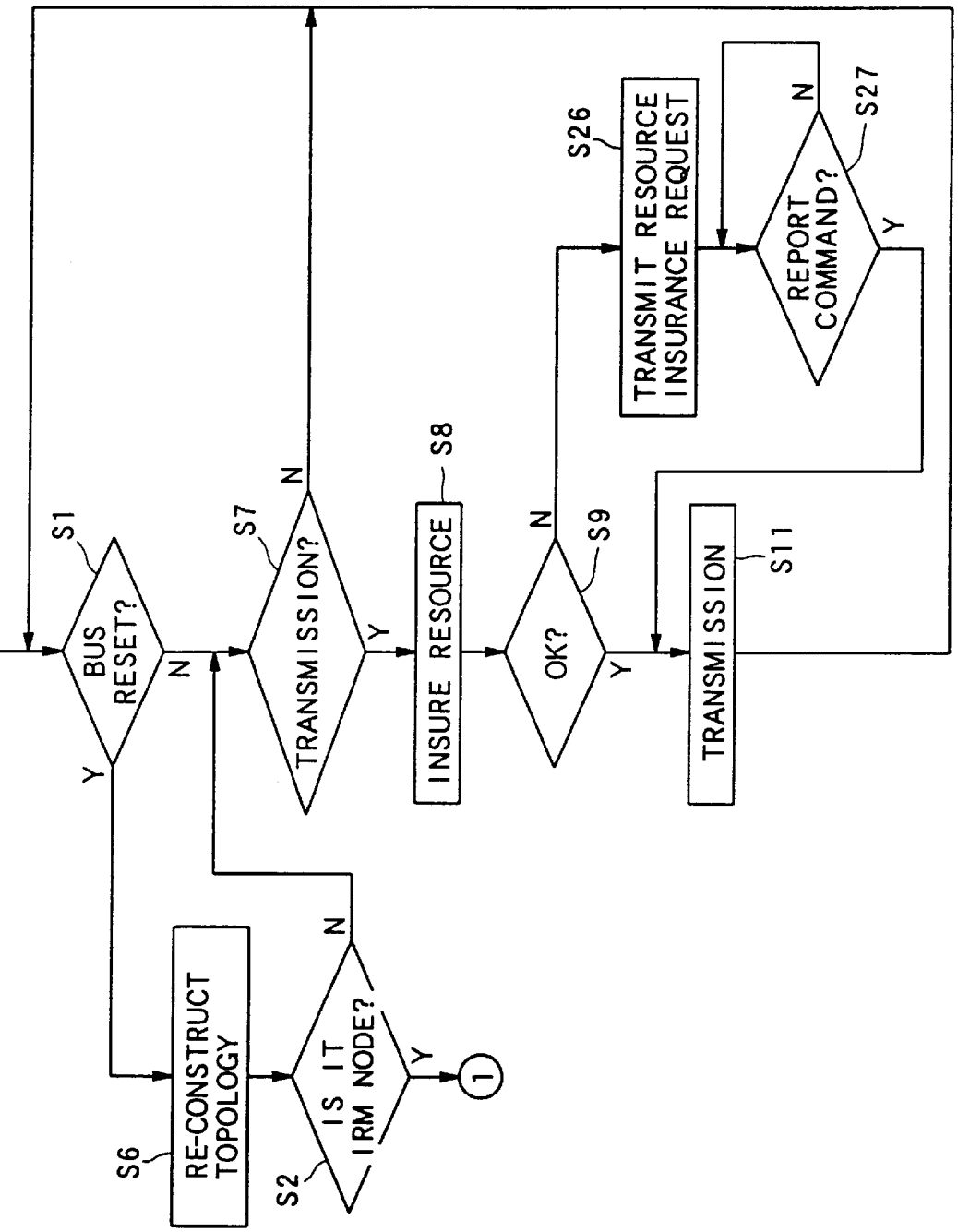
FIG. 18 is a flowchart showing processes in another node of the fifth embodiment.
Figure 19:
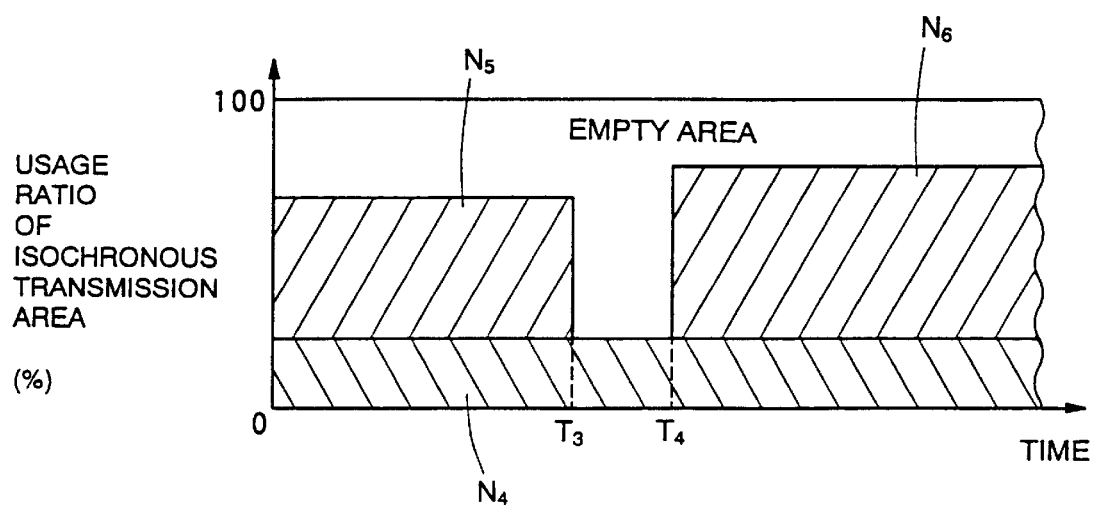
FIG. 19 is a timing chart exemplifying a manner of transmitting the information in the fifth embodiment.

FIG. 15 is a block diagram showing the schematic configuration of an IRM node included in an information transmitting system of the fifth embodiment. FIG. 16 is a block diagram showing the schematic configuration of another general node included in the information transmitting system of the fifth embodiment. FIG. 17 is a flowchart showing the processes in the IRM node of the fifth embodiment. FIG. 18 is a flowchart showing the processes in another node of the fifth embodiment. FIG. 19 is a diagram describing in time series the information transmission in the fifth embodiment In the following description, similarly to the case of the first embodiment, the CD player CP serving as the node is configured as a music reproducing device, in addition to the following configuration.

At first, the configuration and the operations of the IRM node according to the fifth embodiment are described with reference to FIG. 15.

As shown in FIG. 15, an IRM node NI' in the fifth embodiment is provided with a packet transmitter 30, a transmission controller 31, a comparison register 3 and a resource register 5 similar to those of the first embodiment, a packet receiver 32, and request registers 33 serving as transmitter memories in which the number of request registers corresponds to at least the number of other nodes connected to the IRM node NI' (its maximum number is ideally 63).

The transmission controller 31 is composed of the command generator 6 and the comparator 7 similar to those of the first embodiment, a judgment unit 34 and a register writer 35 serving as a reservoir.

Next, the schematic operation will be described below.

The packet receiver 32 carries out the above-mentioned normal packet reception process in the normal information transmission.

Moreover, in the normal information transmission, if a later-described resource insurance request signal Sqr is transmitted by another node desiring to start transmitting the information, the packet receiver 32 receives the resource insurance request signal Sqr, and then stores it in a request register 33 corresponding to the node requesting the insurance of the resource. Here, the content of the resource insurance request signal Sqr actually contains an ID number indicative of the node requesting the insurance of the resource and a content (actually, a channel and a transmission occupation period desired to be used) of the resource desired by the node.

When a request of referring to a content of the resource register 5 in order to start transmitting the information in the arbitration operation is transmitted from another node by using the asynchronous transmission area ACT, the packet receiver 32 receives this request, outputs the reference result to the packet transmitter 30, and again uses the asynchronous transmission area ACT to then transmit (send back) to the node transmitting the reference request. Also, when a request to insure a channel and a transmission occupation period, respectively, to be used by it in the arbitration operation is transmitted from another node by using the asynchronous transmission area ACT, the packet receiver 32 outputs a write signal Swr to the resource register 5, in order to store in the resource register 5 the channel and the transmission occupation period which are desired to be insured.

Then, in the normal information transmission, the resource register 5 outputs its memory and display content as a normal register signal Srg2 to the comparator 7 and the judgment unit 34, similarly to the first embodiment. On the other hand, the resource register 5 outputs its memory and display content as a register signal Srg1 to the comparison register 3 for each preset predetermined time (for example, 1 second), and then re-writes a content of the comparison register 3 into a content similar to the memory and display content of the resource register 5 for each predetermined time. In addition, if a later-described write signal Swr1 is transmitted by the register writer 35, the resource register 5 re-writes its memory and display content, in accordance with a content of the write signal Swr1.

On the other hand, if the write signal Swr is outputted by the packet receiver 32 in the arbitration operation, the resource register 5 updates the memory and display content in accordance with the content of the write signal Swr.

Incidentally, when a control signal indicating that the transmission of the information is ended in one node and then a channel used by the node and a transmission occupation period occupied by the node are released is transmitted by using the asynchronous transmission area ACT, a fact that a new empty channel is generated and also the occupied transmission occupation period is decreased is transmitted as a write signal Swr to the resource register 5, similarly to the case of the first embodiment. The memory and display content of the resource register 5 is updated also in this case.

Next, the comparison register 3 carries out the comparison buffer process similar to that of the first embodiment.

Accordingly, the comparator 7 always compares a content of the register signal Srg2 from the resource register 5 with that of the register signal Srg3 from the comparison register 3, in the normal information transmission. If a difference occurs between those two contents, the comparator 7 generates a comparison signal Scm indicative of the occurrence of the difference and then outputs it to the judgment unit 34.

Here, similarly to the case of the first embodiment, the generation of the comparison signal Scm from the comparator 7 is limited to the case when the resource register 5 is re-written, namely, the case of the occurrence of the channel to be newly used and the increase of the occupied transmission occupation period, or the case of the occurrence of the new empty channel and the decrease of the occupied transmission occupation period.

In parallel with this, if the resource insurance request signal Sqr is transmitted through the packet receiver 32, the request register 33 stores the content of the signal Sqr separately for each node. Then, the request register 33 always outputs the content as a request register signal Srq to the judgment unit 34.

Accordingly, the judgment unit 34 compares the content of the register signal Srg2 with the content of the request register signal Srq transmitted from any one of the request registers 33, at a timing when the comparator 7 generates the comparison signal Scm. If the content of the register signal Srg2 agrees with the content of the request register signal Srq transmitted from any one of the request registers 33 (namely, a resource of a content indicated by the request register signal Srq can be insured in the resource register 5), the judgment unit 34 generates a write control signal Sdd, and then outputs it to the register writer 35.

Then, the register writer 35 receiving the write control signal Sdd generates the write signal Swr1 in order to write the content of the resource to be insured, to the resource register 5, and outputs the write signal Swr1 to the resource register 5, so as to re-write the memory and display content of the resource register 5, and also generates an insurance signal Swc indicative of the insurance of the resource to then output it to the command generator 6.

Accordingly, the command generator 6 generates, in accordance with the insurance signal Swc from the register writer 35, for a node (to the resource register 5 of which the writing operation is performed) requesting a resource newly insured by the register writer 35 among nodes transmitting the resource insurance request signal Sqr to the request register 33, a report command to report the insurance of the requested resource to the node, and then outputs it as a command signal Sco to the packet transmitter 30.

Then, the packet transmitter 30 inserts the command signal Sco into the asynchronous transmission area ACT to generate the transmission data Str, and also transmits it to the node requesting the requested resource through the serial bus B, and further reports to the node the completion of the insurance of the resource desired by the node.

Moreover, in addition to this operation, the packet transmitter 30 transmits the reference result of the resource register 5 to the node requesting the reference by using the asynchronous transmission area ACT, in the arbitration operation, and also carries out the normal packet transmission process in the normal information transmission.

Next, the configuration and the operation of another node connected through the serial bus B to the IRM node NI' will be described below with reference to FIG. 16.

As shown in FIG. 16, a general node N' in the fifth embodiment is provided with a packet transmitter 36, a transmission controller 37 serving as a referring device and a channel time reservoir, a packet receiver 16 similar to the case of the first embodiment and a resource insurance request unit 38 serving as a memory controller.

Next, the schematic operation will be described below.

At first, the packet receiver 16 carries out the above-mentioned normal packet reception process in the normal information transmission, similarly to the case of the first embodiment.

When referring to the content of the resource register 5 in order to start transmitting the information in the arbitration operation, the packet receiver 16 receives the reference result through the serial bus B and the packet transmitter 30 in the IRM node NI', and then transmits the result to a processor (not shown), and further makes the processor carry out an operation of newly insuring the resource. Also, if the insurance of the desired resource is requested from the later-described resource insurance request unit 38 to the IRM node NI' since the resource cannot be insured, when a report command indicative of the insurance of the resource in response to the request is transmitted by the IRM node NI', the packet receiver 16 generates a report signal Smg indicative of the insurance of the resource, and then outputs it to the transmission controller 37.

Next, when starting the transmission of the information from the node N', the transmission controller 37 carries out the arbitration operation in accordance with the control of the processor (not shown), and then generates a request signal Sc of requesting the reference of the resource register 5 in the IRM node NI', and further outputs to the packet transmitter 36. Also, if a resource desired by the node N' can be used as the reference result, the transmission controller 37 transmits the usable situation to the IRM node NI', so as to update the content of the resource register 5 (namely, the resource newly used by the node N is stored in the resource register 5 and displayed).

As described later, the transmission controller 37 carries out a reference request operation to the IRM node NI' one time. As a result, if it is understood that the resource desired by the node N' cannot be used, instead of the node N', the IRM node NI' generates a resource insurance request signal Sqr of requesting the execution of the insurance of the resource desired by the node N', for the resource insurance request unit 38, and then generates a control signal Scrk to control the resource insurance request unit 38 so as to output the signal Sqr to the packet transmitter 36, and then outputs the control signal Scrk to the resource insurance request unit 38.

The resource insurance request unit 38 generates the resource insurance request signal Sqr in accordance with the control signal Scrk, and then outputs it to the packet transmitter 36.

Next, the packet transmitter 36 carries out the above-mentioned normal packet transmission process in the normal information transmission.

In addition to this, the packet transmitter 36 generates a transmission data Str by inserting into the asynchronous transmission area ACT a control signal of requesting the reference of the resource register 5 in the arbitration operation, by the operation of the transmission controller 37, and then transmits it through the serial bus B to the IRM node NI'. Also, if the resource cannot be insured, the packet transmitter 36 generates a transmission data Str including the resource insurance request signal Sqr, and then transmits it to the IRM node NI'. P Next, the operations of the IRM node NI' and the node N' will be detailed below in time series with reference to flowcharts shown in FIGS. 17 and 18. In the flowcharts shown in FIGS. 17 and 18, the similar step numbers are given to the operations identical to those of the flowchart of the first embodiment shown in FIG. 7 or 8, and the explanations of the detailed portions are omitted.

At first, the operations of the IRM node NI' are described with reference to FIG. 17.

The operations at the steps S1, S2 and S6 similar to those of the IRM node NI in the first embodiment are carried out in the IRM node NI' in the fifth embodiment.

If a power supply of the IRM node NI' is successively turned on (Step S2: YES) or if the re-configuration of topology is completed (Step S6), it is next judged whether or not any one of nodes N' requests a resource insurance request signal Sqr of requesting an insurance of a resource desired by the node N' (Step S20). If it is not requested (Step S20: NO), the operational flow returns back to the step S1 as it is, and the above-mentioned operations are repeated. On the other hand, if the resource insurance request signal Sqr is transmitted (Step S20: YES), the content of the desired resource included in the resource insurance request signal Sqr is stored into a request register 33 corresponding to the node N' transmitting the resource insurance request signal Sqr (Step S21).

Next, similarly to the IRM node NI of the first embodiment, it is monitored whether or not the resource register 5 is updated (Steps S3 and S4). If it is not updated (Step S4: NO), the monitor is continued as it is. If it is updated (Step S4: YES), the operation of insuring the resource corresponding to the resource insurance request signal Sqr stored at the step S21 is carried out (Step S22). Here, the process at the step S22 is carried out as the target of each resource insurance process, in the order of starting from the request register 33 in which the resource insurance request signal Sqr is earlier stored, among the plurality of request registers 33.

Then, it is checked whether or not the corresponding resource can be insured (Step S23). If it cannot be insured (actually, if the desired resource is not empty in the resource register 5 after the update) (Step S23: NO), the operational flow again returns to the step S3, and the monitor of the resource register 5 is continued. On the other hand, if it can be insured (Step S23: YES), a report command indicative of the insurance is transmitted to the node N' transmitting the resource insurance request signal Sqr corresponding to the insured resource (Step S24). After that, the content of the request register 33 is cleared which stores the resource insurance request signal Sqr corresponding to the insured resource (Step S25). Then, the operational flow returns back to the step S1, and the processes until now are repeated.

Next, the operations of the other general nodes N' other than the IRM node NI' will be described below with reference to FIG. 18.

The operations at the steps S1, S2 and S6 to S9 similar to those of the node N of the first embodiment shown in FIG. 8 are firstly carried out in the node N' of the fifth embodiment.

Then, if the resource can be insured (Step S9: YES), the insured resource is used to transmit the information (Step S11). After that, the operational flow again returns to the step S1, and the above-mentioned processes are repeated.

On the other hand, if the desired resource cannot be insured in the judgment at the step S9 (Step S9: NO), the resource insurance request signal Sqr is transmitted to the IRM node NI', which executes the insurance of the resource (Step S26).

Then, it is checked whether or not the report command of reporting to the node N' the insurance of the resource requested through the resource insurance request signal Sqr is received, in accordance with a report signal Smg (Step S27). If it is not received (Step S27: NO), the operational flow waits until the reception. If it is received (Step S27: YES), the transmission of the information is started as it is (Step S11).

In view of the above-mentioned operations in time series, as shown in FIG. 19, when a node N5 and another node N4 respectively use their desired resources to transmit the information, if a node N6 requests an insurance of a resource, instead of the node N6, the IRM node NI' insures the resource desired by the node N6. Since the transmission of the information from the node N5 is ended at a time T3, an empty resource is newly generated. If the insurance of the resource desired by the node N6 is completed in conjunction with the generation, the node N6 starts transmitting the information by using the desired resource from a time T4 after the completion.

As mentioned above, according to the operations of the IRM node NI' and the node N' in the fifth embodiment, instead of the node N' trying to transmit the information, the IRM node NI' insures the resource and reports to the node N'. Thus, if the resource cannot be insured, it is possible to avoid the node N' from carrying out the operation of uselessly insuring the resource so that the resource can be effectively insured for the node N'. Hence, the information can be effectively transmitted as the entire information transmitting system.

Only when the resource cannot be insured by the node N', the IRM node NI' carries out the insurance, instead of the node N'. Thus, the insurance can be effectively carried out while the load on the IRM node NI' is kept to a minimum.

In the fifth embodiment, it is targeted in the resource insurance process in the order of starting from the request register 33 in which the resource insurance request signal Sqr is earlier stored among the plurality of request registers 33. However, other than this manner, the following configuration may be considered. That is, the judgment unit 34 determines the order of the insurance of the resource, in accordance with a preset priority for each node. Actually, for example, a priority in an insurance of a resource to other nodes (namely, a start of a transmission of the information) is inputted for each node (this input is carried out by a user itself who mainly uses the node). A priority flag indicative of the set priority is simultaneously transmitted when the resource insurance request signal Sqr is transmitted to the IRM node NI'. A content of the priority flag is stored, for example, in the reserved area 10A (refer to FIG. 5) of the resource register 5. When the resource is insured, the priority flag transmitted in conjunction with each resource insurance request signal Sqr is referred to. Accordingly, the request register 33 storing the resource insurance request signal Sqr having the higher priority is preferentially targeted by the resource insurance process.

For example, in the topology shown in FIG. 1A, the insurance process as the target of the resource insurance process can be preferentially performed on a resource insurance request from a node closer to a route node (the personal PC in the case of FIG. 1A). In this case, when the resource insurance request signal Sqr is transmitted, each node adds a priority flag indicative of a priority corresponding to a position in the topology to the resource insurance request signal Sqr, and transmits it. It is stored in the resource register 5. Accordingly, the judgment unit 34 can recognize the priority. The priority in this case is set at a point when the topology is established. Thus, it is understood that the user does not set it artificially.

Otherwise, as for the resource insurance request signals Sqr stored in the respective request registers 33, the resources represented by the signal Sqr may be preferentially targeted by the resource insurance process, in such an order that the transmission occupation period is the shorter. Conversely, they may be preferentially targeted by the resource insurance process, in such an order that the transmission occupation period is the longer.

(VII) Sixth Embodiment

A sixth embodiment which is another embodiment of the present invention executed in accordance with the serial bus standard will be described below with reference to FIGS. 20 to 21.

Figure 20:
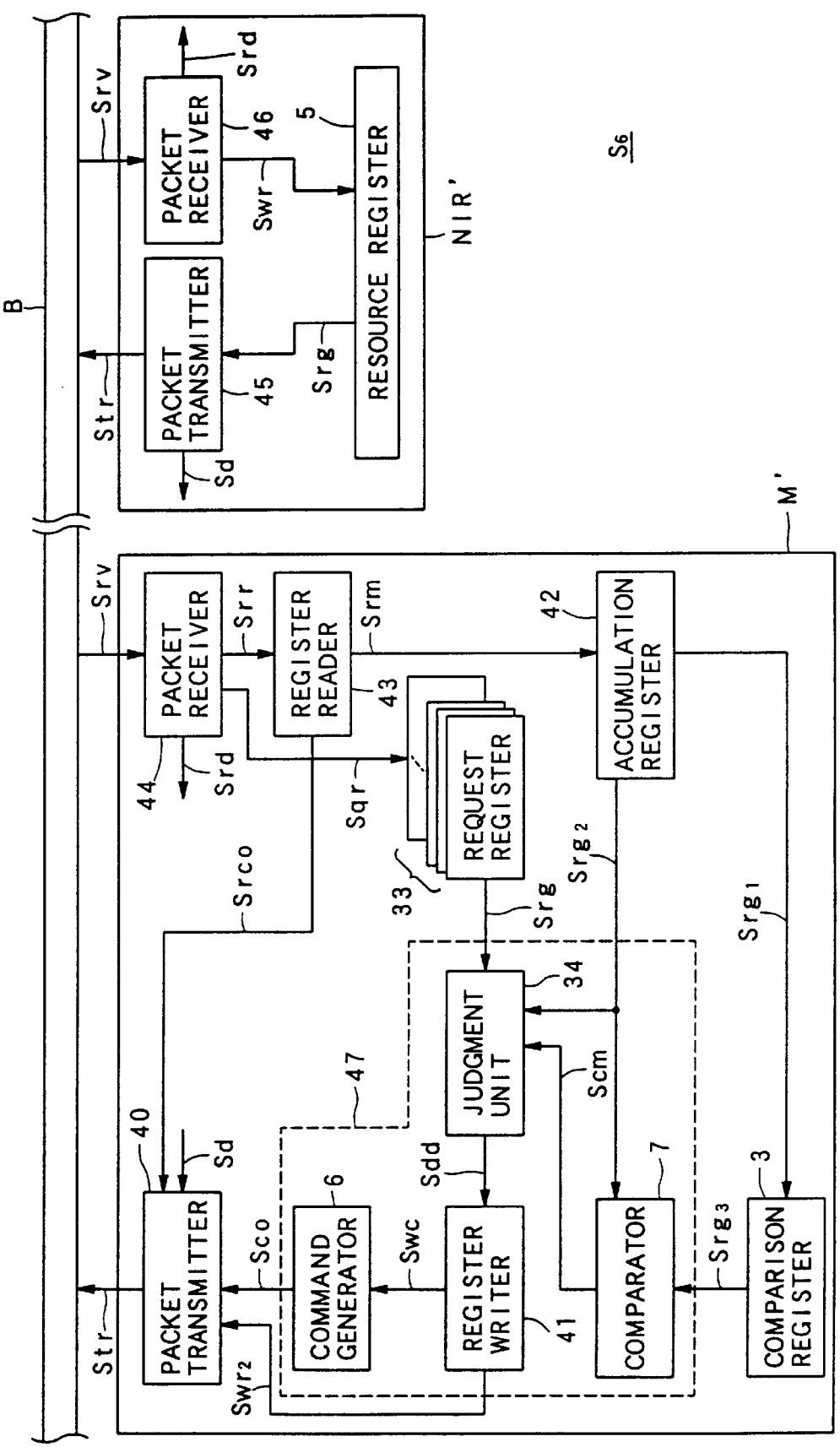
FIG. 20 is a block diagram showing a configuration of each node of a sixth embodiment.
Figure 21:
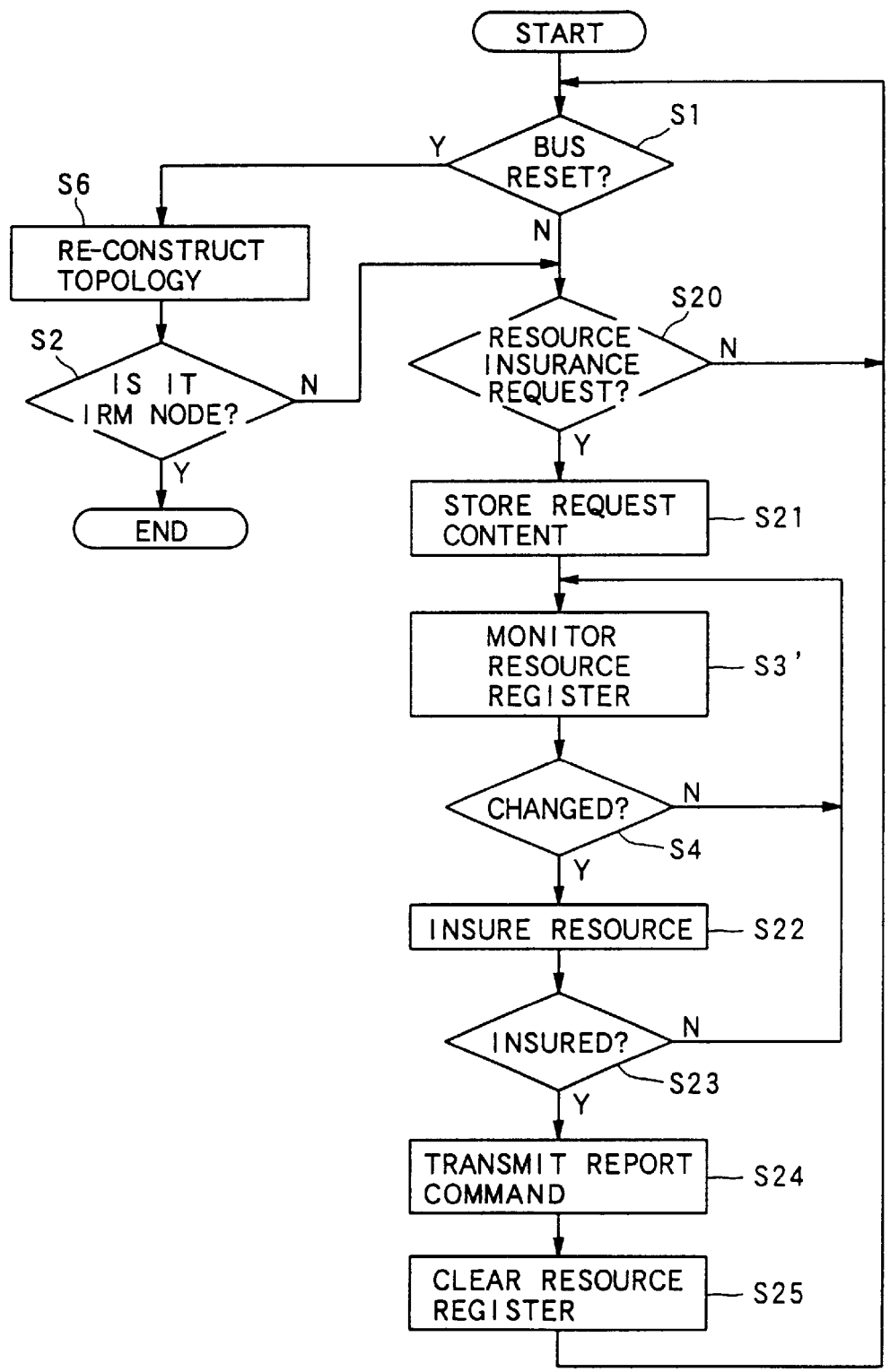
FIG. 21 is a flowchart showing processes in an IRM node of the sixth embodiment.

FIG. 20 is a block diagram showing the configuration of each node included in an information transmitting system S6 of the sixth embodiment, and FIG. 21 is a flowchart showing the processes in a management node of the sixth embodiment.

In the fifth embodiment, the IRM node NI' having the resource register 5 insures the resource, instead of another node N'. However, in the sixth embodiment, instead, a management node which is a node different from the IRM node executes the insurance of the resource.

At first, the configuration and the operations of the node included in the information transmitting system of the sixth embodiment are described with reference to FIG. 20. In FIG. 20, the similar member numbers are given to the members similar to the respective members in the fifth embodiment, and the explanations of the detailed portions are omitted.

The configuration of the IRM node included in the information transmitting system of the sixth embodiment is firstly described.

As shown in FIG. 20, an IRM node NIR' of the sixth embodiment has the configuration similar to the IRM node typically defined on the serial bus standard, and it is actually provided with a resource register 5, a packet transmitter 45 and a packet receiver 46 similar to the case of the fifth embodiment.

Next, the operations will be described below.

At first, the packet receiver 46 carries out the above-mentioned normal packet reception process, in the normal information transmission.

When a request of referring to a content of the resource register 5 in order to start transmitting the information in the arbitration operation is transmitted from another node by using the asynchronous transmission area ACT, the packet receiver 46 receives this request, outputs the reference result as a register signal Srg to the packet transmitter 45, and then transmits (sends back) to the node transmitting the reference request. Also, when each insurance of a channel and a transmission occupation period to be used by it in the arbitration operation is transmitted from another node by using the asynchronous transmission area ACT, the packet receiver 46 outputs a write signal Swr to the resource register 5, in order to store into the resource register 5 the insured channel and transmission occupation period.

In addition to this, when a re-write signal Swr2 indicating that a memory and display content of the resource register 5 is rewritten is transmitted by a later-described management node M', the packet receiver 46 generates a write signal Swr so as to update the resource register 5, in accordance with a content indicated by the re-write signal Swr2, and then outputs it to the resource register 5.

On the other hand, the packet transmitter 45 carries out the above-mentioned normal packet transmission process in the normal information transmission.

In addition to this, the packet transmitter 45 transmits the register signal Srg which is the reference result of the resource register 5, as the transmission data Str, to the node requesting the reference by using the asynchronous transmission area ACT, in the arbitration operation.

Moreover, when a read out request signal Srco is transmitted by a later-described management node M' in order to read out the memory and display content of the resource register 5, the packet receiver 46 receives the read out request signal Srco. Accordingly, the packet transmitter 45 reads out the memory and display content of the resource register 5 as a register signal Srg, and then transmits it to the management node M' as a transmission data Str.

Next, the configuration of the management node M' included in the information transmitting system of the sixth embodiment will be described below.

As shown in FIG. 20, the management node M' in the sixth embodiment is provided with request registers 33 similar to the case of the IRM node NI' in the fifth embodiment, a comparison register 3, a transmission controller 47 containing a command generator 6, a comparator 7, a judgment unit 34 and a register writer 41, a packet receiver 44, a packet transmitter 40, an accumulation register 42 and a register reader 43.

Next, the operations will be described below.

At first, the packet receiver 44 carries out the above-mentioned normal packet reception process in the normal information transmission.

In parallel with this, when the memory and display content of the resource register 5 is transmitted by the IRM node NIR' in accordance with a read out request signal Srco from the register reader 43, the packet receiver 44 outputs the content as a content data Srr to the register reader 43.

Moreover, when a resource insurance request signal Sqr is transmitted by another node desiring to start transmitting the information, the packet receiver 44 receives the resource insurance request signal Sqr, and then stores it into a request register 33 corresponding to the node requesting the insurance of the resource, similarly to the packet receiver 32 in the fifth embodiment.

Next, the register reader 43 generates the read out request signal Srco, for example, at a rate of one time for each 10 isochronous cycles IC, and then outputs it as the transmission data Str through the packet transmitter 40 to the IRM node NIR'. Also, if the memory and display content of the resource register 5 is transmitted correspondingly to the outputted read out request signal Srco and then it is inputted as the content data Srr, the register reader 43 outputs it as it is as a write signal Srm to the accumulation register 42. Thus, the content of the resource register 5 is copied as it is to the accumulation register 42, for each 10 isochronous cycles IC.

Then, the accumulation register 42 outputs its memory and display content as a normal register signal Srg2 to the comparator 7 and the judgment unit 34. On the other hand, the accumulation register 42 outputs its memory and display content as a register signal Srg1 to the comparison register 3 for each preset predetermined time (for example, 1 second), and then re-writes a content of the comparison register 3 into a content similar to the memory and display content of the accumulation register 42 for each predetermined time.

Accordingly, when a control signal indicating that the transmission of the information is ended in another one node and then a channel used by the node and a transmission occupation period occupied by the node are released is transmitted to the IRM node NIR' by using the asynchronous transmission area ACT, the IRM node NIR' transmits a fact that a new empty channel is generated and also the occupied transmission occupation period is decreased, as a write signal Swr to the resource register 5. Accordingly, the memory and display content of the resource register 5 is updated, and the memory and display content of the accumulation register 42 is also updated at the substantially same time.

Next, the comparison register 3 carries out the comparison buffer process similar to that of the first embodiment.

Accordingly, the comparator 7 always compares a content of the register signal Srg2 from the accumulation register 42 with that of the register signal Srg3 from the comparison register 3, in the normal information transmission similarly to the case of the fifth embodiment. If a difference occurs between those two contents, the comparator 7 generates a comparison signal Scm indicative of the occurrence of the difference, and then outputs it to the judgment unit 34.

Here, as mentioned above, the generation of the comparison signal Scm is limited to the case when the accumulation register 42 is re-written.

On the other hand, similarly to the case of the fifth embodiment, if the resource insurance request signal Sqr is transmitted through the packet receiver 44, the request register 33 stores the content of the signal Sqr separately for each node. Then, the request register 33 always outputs the content as a request register signal Srq to the judgment unit 34.

Accordingly, the judgment unit 34 compares the content of the register signal Srg2 with the contents of the request register signals Srq transmitted from the respective request registers 33, at a timing when the comparator 7 generates the comparison signal Scm. If the content of the register signal Srg2 agrees with the content of any one of the request register signals Srq, the judgment unit 34 generates a write control signal Sdd, and then outputs it to the register writer 41.

Then, the register writer 41 receiving the write control signal Sdd generates the re-write signal Swr2 so as to write the content of the resource to be insured, to the resource register 5 in the IRM node NIR', and outputs the re-write signal Swr2 through the packet transmitter 40 to the IRM node NI', and re-writes the memory and display content of the resource register 5, and then generates an insurance signal Swc indicative of the insurance of the resource to output it to the command generator 6.

Accordingly, similarly to the case of the fifth embodiment, in accordance with the insurance signal Swc from the register writer 41, the command generator 6 generates, for a node requesting a resource newly insured by the register writer 41 among nodes transmitting the resource insurance request signals Sqr to the request registers 33, a report command to report the insurance of the requested resource to the node, and then outputs it as a command signal Sco to the packet transmitter 40.

Then, the packet transmitter 40 inserts the command signal Sco into the asynchronous transmission area ACT to thereby generate the transmission data Str, and also transmits it to the node requesting the requested resource through the serial bus B, and further reports to the node the completion of the insurance of the resource desired by the node.

Moreover, in addition to this operation, the packet transmitter 40 carries out the normal packet transmission process in the normal information transmission.

Next, the operations of the management node M' and the IRM node NIR' will be collectively detailed below in time series with reference to a flowchart shown in FIG. 21. In the flowchart shown in FIG. 21, the similar step numbers are given to the operations identical to those of the flowchart shown in FIG. 17, and the explanations of the detailed portions are omitted.

The operations at the steps S1, S2, S6, S20 and S21 similar to the operations in the IRM node NI' of the fifth embodiment are firstly executed in the management node M' of the sixth embodiment.

Next, the memory and display content of the resource register 5 is monitored (Steps S3' and S4). Actually, the processes at the steps S3' and S4 are executed similarly to the operations at the steps S3' and S4 in the third embodiment shown in FIG. 13.

If the memory and display content of the accumulation register 42 (namely, the resource register 5) is changed during the monitor (Step S3') (Step S4: YES), the operations at the steps S22 to S25 in the fifth embodiment are executed. Then, the operational flow again returns to the step S1, and the above-mentioned processes are repeated.

In addition, the configuration of the typical node other than the IRM node NIR' and the management node M' in the information transmitting system of the sixth embodiment is perfectly similar to that of the node N' in the fifth embodiment. Moreover, the processes thereof are perfectly similar to those of the node N' in the fifth embodiment except that the transmission destination of the resource insurance request signal Sqr is the management node M and also the transmission source of the report command is the management node M'. Thus, the explanations of the detailed portions are omitted.

As mentioned above, according to the operations of the IRM node NIR' and the management node M' in the sixth embodiment, even if the node which monitors the resource register 5 and reports when the update is performed is the node different from the different from the IRM node NIR having the resource register 5, the effect similar to that of the fifth embodiment can be achieved.

In addition, as a method of recognizing the node which cannot insure the resource in the management node M', the following method may be considered. For example, when a node tries to insure a resource for an IRM node NIR', the IRM node NIR' makes the node insuring the resource recognize an ID number of the management node M'. After this recognition, the information can be sent and received between the management node M' and its node. Also, at a time of setting the management node M', if the ID number of the management node M' is recognized by another node, it is enough that the node requesting the insurance of the resource directly reports its request to the management node M'.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.10-374413 filed on Dec. 28, 1998 including the specification, claims, drawings and summary is incorporated herein by reference in its entirety.

What is claimed is:

1. A transmission managing apparatus for managing a transmission state of information transmitted through a communication bus, comprising:
   a first storage device for storing the transmission state of the information and outputting the content of the transmission state;
   a second storage device for storing the transmission state of the information, replacing the content of the second storage device with the content outputted from the first storage device, and outputting the replaced content of the transmission state; and
   a comparing device for comparing the content outputted from the first storage device with the content outputted from the second storage device, and judging change of the transmission state of the information, wherein
   the first storage device outputs the content of the transmission state to the comparing device continuously and outputs the content of the transmission state to the second storage device at predetermined time intervals, and
   the comparing device judges that the change of the transmission state of the information occurs, when the both outputted contents are different.

2. The transmission managing apparatus according to claim 1, wherein
   the change of the transmission state of the information is at least any one of the change of channel which is occupied for transmitting the information through the communication bus and the change of the transmission occupation period.

* * * * *